United States Patent
Siminoff

(10) Patent No.: US 10,939,120 B1
(45) Date of Patent: Mar. 2, 2021

(54) VIDEO UPLOAD IN LIMITED BANDWIDTH

(71) Applicant: Amazon Technologies, inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 16/193,671

(22) Filed: Nov. 16, 2018

Related U.S. Application Data

(60) Provisional application No. 62/598,732, filed on Dec. 14, 2017.

(51) Int. Cl.
| | |
|---|---|
| H04N 11/02 | (2006.01) |
| H04N 19/146 | (2014.01) |
| G06K 9/00 | (2006.01) |
| G06K 9/62 | (2006.01) |
| H04N 19/30 | (2014.01) |
| H04N 19/184 | (2014.01) |

(52) U.S. Cl.
CPC ....... *H04N 19/146* (2014.11); *G06K 9/00228* (2013.01); *G06K 9/00711* (2013.01); *G06K 9/6202* (2013.01); *G06K 9/6215* (2013.01); *H04N 19/184* (2014.11); *H04N 19/30* (2014.11); *G06K 9/00771* (2013.01)

(58) Field of Classification Search
CPC .... H04N 19/146; H04N 19/184; H04N 19/30; G06K 9/00228; G06K 9/00711; G06K 9/6202; G06K 9/6215; G06K 9/00771

USPC ................ 375/240.02; 348/43; 1/1; 709/226
See application file for complete search history.

(56) References Cited

U.S. PATENT DOCUMENTS

| | | | |
|---|---|---|---|
| 8,780,201 B1 | 7/2014 | Scalisi et al. | |
| 10,412,487 B2* | 9/2019 | Shahamat | ........ G08B 13/19656 |
| 2002/0091825 A1* | 7/2002 | Shuster | ................... H04L 47/29 |
| | | | 709/226 |

(Continued)

OTHER PUBLICATIONS

Bertolami, Video Quality Graceful Degradation, http://bertolami.com/index.php?engine=blog&content=posts&detail=graceful-degradation-in-video-streams, Feb. 28, 2017, pp. 1/4.

(Continued)

*Primary Examiner* — Jayanti K Patel
*Assistant Examiner* — Richard B Carter
(74) *Attorney, Agent, or Firm* — Greenberg Traurig, LLP

(57) ABSTRACT

A method of improved use of available bandwidth involves capturing, by a camera of an audio/video (A/V) device, live video of a scene that includes a plurality of frames. A first frame of the plurality of frames is a first amount of data. The method also includes determining a data bandwidth between a computing device and the A/V recording and communication device. The method further involves determining that a first portion of the first frame includes a first object, such as a human face, wherein the first frame includes a second portion that does not include the first portion. Additionally, the method involves modifying the first frame to reduce at least a quality of the second portion, wherein the size of the data of the modified frame does not exceed the data bandwidth. The method also involves transmitting the modified frame to the computing device.

20 Claims, 17 Drawing Sheets

(56) References Cited

U.S. PATENT DOCUMENTS

| | | | | |
|---|---|---|---|---|
| 2015/0054949 A1* | 2/2015 | Scalisi | .................. | H04N 7/188 |
| | | | | 348/143 |
| 2017/0085843 A1* | 3/2017 | Scalisi | .................. | H04N 7/188 |
| 2017/0085844 A1* | 3/2017 | Scalisi | ................ | G06Q 50/163 |

OTHER PUBLICATIONS

Riedel, Skype TX Control, User Manual, Version 1.0.8902.23rl, R1—Copyright Microsoft Corporation & Riedel Communications GmbH & Co. KG 2014, 42 pgs.

Schroff et al., FaceNet: A Unified Embedding for Face Recognition and Clustering, Jun. 17, 2015, 10 pgs.

Snape et al., Face Flow, Department of Computing, imperial College London, 180 Queens Gate, SW7 2AZ, London, U.K., 9 pgs.

\* cited by examiner

VIDEO UPLOAD IN LIMITED BANDWIDTH

CROSS-REFERENCE TO RELATED APPLICATION

This application claims priority to provisional application Ser. No. 62/598,732, filed on Dec. 14, 2017, the entire contents of which are hereby incorporated by reference.

FIELD OF THE DISCLOSURE

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/video (A/V) recording and communication devices, such as surveillance cameras, whether alone or integrated within other devices such as doorbells or lighting fixtures, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present methods for improving the use of available bandwidth for audio/video (A/V) recording and communication devices now will be discussed in detail with an emphasis on highlighting the advantageous features. These embodiments depict the novel and non-obvious methods for improving the use of available bandwidth for audio/video (A/V) recording and communication devices shown in the accompanying drawings, which are for illustrative purposes only. These drawings include the following figures, in which like numerals indicate like parts.

DETAILED DESCRIPTION

Figure 1:
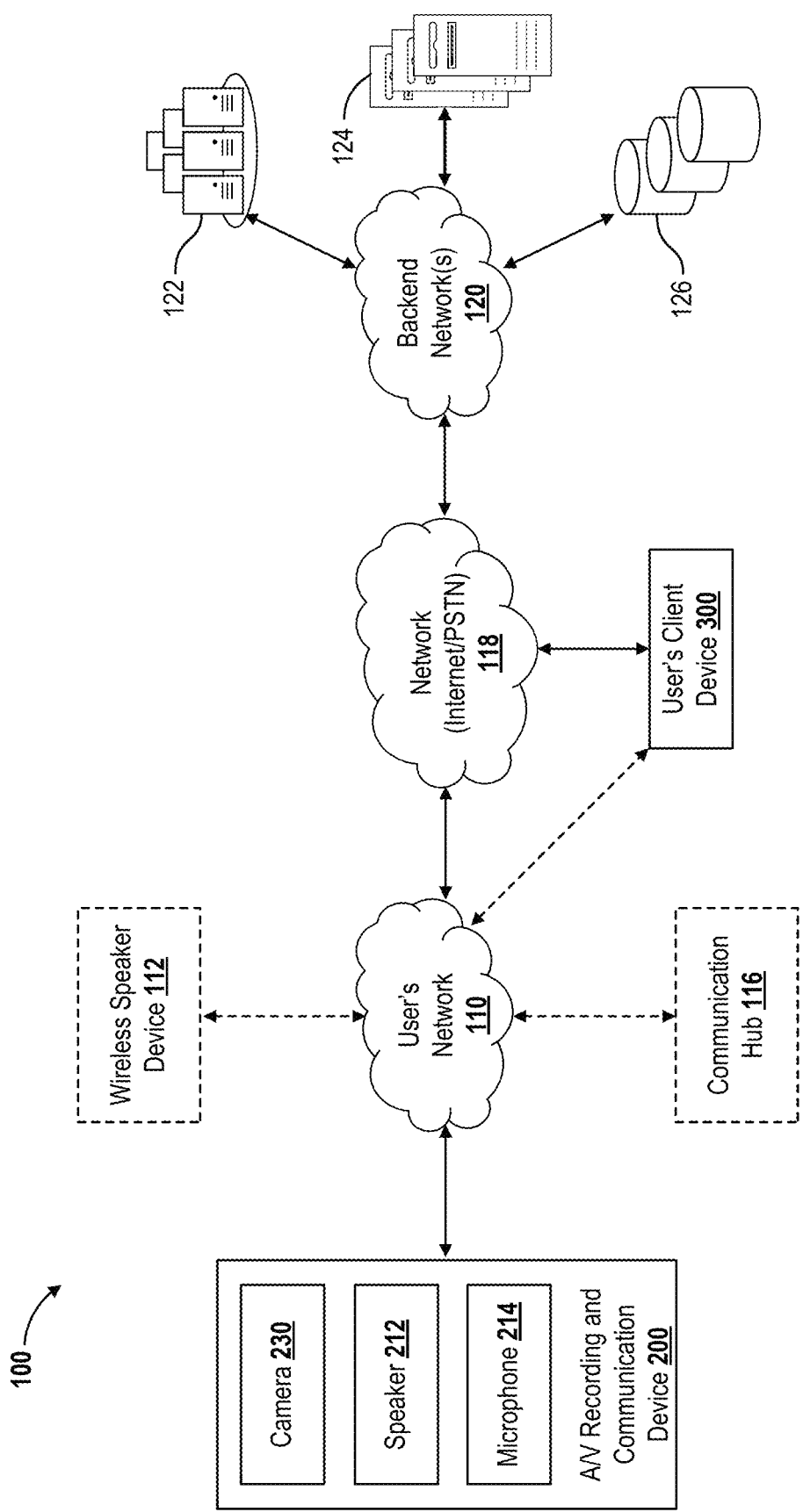
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. Example methods, apparatuses, and systems described herein are not intended to limit the scope of the description to the precise form or forms detailed herein. Instead the following description is intended to be illustrative so that others may follow its teachings.

The rate of data transfer from one device to another over a network can vary over time. In an example system, a video recording device may be communicatively coupled to a router, which itself is connected to an Internet-connected modem. A server within this system may be communicatively coupled to the modem via the Internet. Data transmitted from the video recording device to the server may traverse a series of communication endpoints or nodes. Network traffic, hardware failures, and/or other factors may affect the rate of data transfer from the video recording device to the server. For instance, substantial network traffic through the router coupled to the video recording device might reduce the data throughput from the video recording device to the server. Additionally, network congestion at certain Internet nodes along the communication path between the video recording device and the server might affect data transfer rates over time. Thus, the amount of data that can be transmitted from the video recording device to the server over a given period of time (e.g., the number of bits per second) may depend on many time-varying factors.

The amount of data that can be transmitted from one device to another device over a unit period of time may be referred to herein as "available bandwidth" or "data bandwidth." The available bandwidth may, in some cases, be the effective data transfer rate from one device to another device at an instant in time. Additionally, the "available bandwidth" may refer to the data transfer rate from one device to another device, which may describe the net effect of one or more bandwidth-limiting nodes in a communication path.

In some circumstances, the data to be transmitted exceeds the available bandwidth. One way to address this problem is to compress the data to be transmitted, so that transmitting the compressed data does not exceed that bandwidth. In video data, such compression might involve reducing pixel color depth, reducing the resolution, and/or reducing the frame rate, among other compression techniques. While "dynamic" video compression—video compression that is done in substantially real-time—permits video to be transmitted with little to no interruption, the cost of such video compression is typically a reduction in video quality. Depending on the type and manner of compression, it might be difficult to resolve important details from compressed video that might otherwise have been resolvable absent such compression.

High video quality is often desired in home security systems. An individual's face, clothing, and/or other unique features of that individual are useful details for identifying that individual. Certain aspects of the individual, such as items he or she is carrying, may be indicative of suspicious or illicit activity. However, typical video compression techniques might reduce video quality in a way that renders these important details within the video difficult to resolve. It is therefore desired to have a home security system that is capable of capturing and transmitting a continuous or substantially continuous stream of live video over a limited-bandwidth network, while mitigating the adverse effects of video compression.

Example techniques of the present disclosure involve determining, within a video frame, a first portion that includes an "object of interest" (e.g., a person's face, portions of a person's body, objects on or near the person, etc.) and a second portion constituting the remainder of the frame other than the first portion. By reducing the quality of the second portion, without reducing the quality of the first portion (or reducing the quality of the first portion by a lesser amount as compared to the quality reduction of the second portion), the amount of data used to represent the video frame is reduced, while the quality of the object of interest is not reduced or reduced by a lesser amount.

A specific example is described below. The present disclosure, however, is not limited in any way to the values or specific technique(s) described in the following example; it is provided for explanatory purposes to facilitate understanding of the disclosure.

In an example scenario, live video is captured by an audio/video (A/V) recording and communication device at a rate of 30 frames per second (fps). Each video frame is represented by a set of pixels, with each pixel having a 24-bit color depth-8 bits of red, 8 bits of green, and 8 bits of blue. Each video frame is represented as 1 megabit (1,000 kilobits) of data. Thus, without considering frame-to-frame compression (e.g., I-frame or P-frame compression), transmitting the live video without interruption would involve a data bandwidth of at least 30 megabits per second (Mb/s).

In this example scenario, the A/V recording and communication device transmits the live video to a server over the Internet. If the available bandwidth between the A/V recording and communication device and the server decreases to 22.5 Mb/s, then the full-quality live video can no longer be transmitted. At a data bandwidth of 22.5 Mb/s, the threshold per-frame bandwidth at 30 fps would be 750 kilobits.

In example embodiments, the A/V recording and communication device identifies, within a video frame, a portion of that frame that represents a person's face. In one simple example, the portion of the frame the frame that includes the person's face constitutes one-half of the pixels in the frame, while the other half of the pixels represent the remaining field-of-view (e.g., the surrounding environment). The A/V recording and communication device then reduces the quality of the environment portion of the frame by reducing the color depth of those pixels from 24-bit to 12-bit. As a result, the portion of the frame containing the person's face is 500 kilobits of data, while the environment portion of the frame is 250 kilobits of data, such that the total amount of data of the modified frame is 750 kilobits, and is therefore within the available bandwidth. In this manner, the quality of the person's face in the video frame is prioritized over the quality of the surrounding environment.

In some embodiments, the quality of the portion of the frame containing the object of interest (also referred to hereinafter as the "portion of interest") may also be reduced. In some examples, the quality of the portion of interest may be reduced by a lesser amount than the quality of the environment portion.

Aspects other than color depth may be modified to reduce the amount of data used to represent a portion of a video frame. For example, the resolution of the environment portion may be reduced (or effectively reduced, e.g., by setting a block of adjacent pixels to their average color). As another example, one or more color channels may be removed entirely, or may be compressed or transformed to form fewer color channels.

Some embodiments may involve transmitting the portion of interest, and not transmitting the environment portion. An example implementation may involve transmitting the environment portion in an initial frame, and then transmitting a set of successive frames containing the portion of interest without the environment. Post-processing may be performed by a server or other computing device to, for example, overlay the portion of interest onto the environment portion for a set of frames.

In various embodiments, identifying the presence of an object of interest within a video frame may involve the use of object recognition, pattern recognition, and/or other image or video processing tools. An object recognition engine may identify a "class" of objects (e.g., human faces, clothing logos, weapons, etc.), or may identify specific objects (e.g., a particular person's face, a specific logo, a specific weapon, etc.). The presence of an object of interest may be determined on the basis of the object recognition engine indicating the presence of an object of interest at or above a threshold level of confidence. An example object recognition engine is described in more detail below with respect to FIG. 11.

In some cases, such as when the object recognition engine is configured to detect frame portions containing human faces, the object of interest may serve as input into subsequent operations. For instance, the relatively higher quality frame portion containing a person's face may be input to a face identification system to attempt to identify the person in the frame. In some implementations, an A/V recording and communication device and/or a backend server may be configured to alert a user of the presence of an unknown person at their front door. The A/V recording and communication device may facilitate facial registration for the user, the user's family members, and/or other trusted individuals. When the A/V recording and communication device captures video frames containing a person's face, that person's face may be compared against registered facial data of known or trusted individuals (e.g., using computer vision techniques to transform image data into feature values). If the person in the video frame is not registered, the A/V recording and communication device or its associated systems may notify the user of the presence of an unknown individual at the door. The video frame modification techniques of the present disclosure—which prioritize the quality of human faces in some embodiments—may provide higher quality face data for such subsequent operations compared to traditional video frame compression methods.

In some instances, the quality-modification techniques described herein may be carried out based on a target data size, which may not necessarily be related to the available data bandwidth. For instance, maintaining a low video bitrate may be desired to manage server load or video storage sizes. As another example, a volatile network bitrate may unpredictably swing between high data rates and low data rates. In some cases, a user may wish to constrain data transmission in order to avoid exceeding a data cap from the user's Internet service provider. Regardless of the circumstances, determining the manner and extent to which an image's or video frame's quality is modified may depend on a target data size.

The target data size may be a predetermined or threshold amount of data. For example, the target data size may be a threshold amount of data on a per-frame basis that achieves a desired video bitrate. The target data size may be a configurable parameter, which could be set by a user, an administrator, or the like. The target data size may be determined based on some mathematical relationship or algorithm (e.g., a threshold per-frame data size derived from a desired video bitrate). Regardless of the particular technique for determining target data size, the target data size may or may not be related to or based on the available bandwidth of the network; in other words, the techniques of the present application may be applied to reduce video frame data sizes even in circumstances where sufficient bandwidth exists.

FIG. 1 discloses an example system 100 of the present disclosure. The system includes an audio/video (A/V) recording and communication device 200, which includes a camera 230, a speaker 212, and a microphone 214, among other components. An example A/V recording and communication device is shown and described in more detail with respect to FIG. 2.

While the present disclosure provides numerous examples of methods and systems including A/V recording and communication doorbells, the present embodiments are equally applicable for A/V recording and communication devices 200 other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. An example A/V recording and communication security camera may further omit other components. In another example, the present embodiments may include one or more A/V recording and communication floodlight controllers instead of, or in addition to, one or more A/V recording and communication doorbells.

The A/V recording and communication device 200 may be located near the entrance to a structure (not shown), such as a dwelling, a business, a storage facility, etc. The A/V recording and communication device 200 includes a camera 230, a speaker 212, and a microphone 214. The camera 230 may comprise, for example, a high definition (HD) video camera, such as one capable of capturing video images at an image display resolution of 720p, 1080p, 2120p or any other image display resolution. While not shown, the A/V recording and communication device 200 may also include other hardware and/or components, such as a housing, a communication module (which may facilitate wired and/or wireless communication with other devices), one or more motion sensors (and/or other types of sensors), a button, etc. The A/V recording and communication device 200 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth herein.

With further reference to FIG. 1, the A/V recording and communication device 200 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 may be connected to another network 118, which may comprise, for example, the Internet and/or a public switched telephone network (PSTN). As described below, the A/V recording and communication device 200 may communicate with the user's client device 300 via the user's network 110 and, optionally, the network 118 (Internet/PSTN). The user's client device 300 may comprise, for example, a mobile telephone (which may also be referred to as a cellular telephone), such as a smartphone, a personal digital assistant (PDA), or another communication device. The user's client device 300 comprises a display (not shown) and related components capable of displaying streaming and/or recorded video images. The user's client device 300 may also comprise a speaker and related components capable of broadcasting streaming and/or recorded audio, and may also comprise a microphone.

The A/V recording and communication device 200 may also communicate, via the user's network 110 and the network 118 (Internet/PSTN), with a backend network(s) 120 of servers and/or backend devices, such as (but not limited to) one or more remote storage devices 126 (which may be referred to interchangeably as "cloud storage device(s)"), one or more backend servers 124, and one or more backend APIs 122. While FIG. 1 illustrates the storage device 126, the server 124, and the backend API 122 as components separate from the network 120, it is to be understood that the storage device 126, the server 124, and/or the backend API 122 may be considered to be components of the network 120, in an embodiment.

The network 118 may be any wireless network or any wired network, or a combination thereof, configured to operatively couple the above-mentioned modules, devices, and systems as shown in FIG. 1. For example, the network 118 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (who may be referred to interchangeably as "visitor," "intruder," "burglar," or other terms) arrives at the A/V recording and communication device 200, the A/V recording and communication device 200 detects the visitor's presence and begins capturing video images within a field of view of the camera 230. The A/V communication device 200 may also capture audio through the microphone 214. The A/V recording and communication device 200 may detect the visitor's presence by detecting motion using the camera 230 and/or a motion sensor (e.g., one or more passive infrared sensors (PIRs) or any other type of motion sensor), and/or by detecting that the visitor has pressed a front button of the A/V recording and communication device 200 (e.g., if the A/V recording and communication device 200 is a doorbell).

In response to the detection of the visitor, the A/V recording and communication device 200 may send an alert to the user's client device 300 (FIG. 1) via the user's network 110 and the network 118. The A/V recording and communication device 200 also sends streaming video, and may also send streaming audio, to the user's client device 300. If the user answers the alert, two-way audio communication may then occur between the visitor and the user through the A/V recording and communication device 200 and the user's client device 300. The user may view the visitor throughout the duration of the call, but the visitor cannot see the user (unless the A/V recording and communication device 200 includes a display, which it may in some embodiments).

The video images captured by the camera 230 of the A/V recording and communication device 200 (and the audio captured by the microphone 214) may be uploaded to the cloud and recorded on the remote storage device 126 (FIG. 1). In some embodiments, the video and/or audio may be recorded on the remote storage device 126 even if the user chooses to ignore the alert sent to the client device 300.

With further reference to FIG. 1, the system 100 may further comprise a backend API 122 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicates with one another using their public APIs. In some embodiments, the API backend may hold the bulk of the user data and offer the user management capabilities, leaving the clients to have very limited state.

The backend API 122 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

In some embodiments, the system 100 of FIG. 1 also includes a wireless speaker device 112. The wireless speaker device 112 may be capable of communicating over one or more networks. When connected to the user's network 110, the wireless speaker device 112 may serve to produce an audible sound responsive to the A/V recording and communication device 200 receiving an input (e.g., a visitor pressing the doorbell button on the A/V recording and communication device 200).

The wireless speaker device 112 may connect to the user's network 110 via Wi-Fi, in one aspect of the present disclosure. The wireless speaker device 112 may also communicate directly with, and communicate with other devices via, a communication hub 116. Other communication protocols and/or standards may also be used. The wireless speaker device 112 may be a stand-alone product or component capable of emitting an audible sound, amongst other functions, to a user within audible range of the wireless speaker device 112.

In an example operation, a user pressing a button on the A/V recording and communication device 200 causes the transmission of a message or signal to a computing device over a network. That computing device may then echo that message, or transmit a different message, to the wireless speaker device 112. That message may, among other things, include instructions that cause the wireless speaker device to produce one or more audible sounds. Other example wireless speaker devices may be described in greater detail below.

In some embodiments, the system 100 further includes communicatively coupled thereto the communication hub 116. The communication hub 116 may be capable of communicating directly (e.g., via Wi-Fi Direct, Bluetooth, Zigbee, etc.), and/or via the user's network 110, with the A/V recording and communication device 200, the client device 300, the wireless speaker 112, other devices present within the user's home, and/or other devices across the Internet network 118.

In some implementations, the communication hub 116 is a "smart" hub capable of facilitating communication among two or more devices across a network. For example, the communication hub 116 may relay information between the A/V recording and communication device 200 and the user's client device 300, to facilitate bidirectional audio transmissions therebetween (e.g., establishing two-way audio communication between a visitor at the A/V recording and communication device 200 and the user's client device 300) without the need of a backend server device.

The communication hub 116 may also provide device internetworking functionality, allowing one device to communicate to another device without a separate backend server or computing device. For instance, two A/V recording and communication devices 200 (e.g., one at the front door and one at the back door of a user's home) may communicate to one another through the communication hub 116. One A/V recording and communication device 200 may, upon experiencing a triggering event, broadcast a message to other A/V recording and communication devices 200 in the user's network 110, instructing those devices to carry out some action. In this manner, device-to-device cooperation may be achieved, without requiring backend server interaction (although, backend server communication may also occur).

In some embodiments, the A/V recording and communication device 200 and communication hub 116 may be provided as part of a broader home or premises security system. In such embodiments, the system 100 may further include one or more security sensors (not shown). The security sensors may include, for example, door open sensors, motion sensors, glass break sensors, and the like. In such embodiments, the communication hub 116 may further act as a control system for the security sensors and may activate and deactivate the security sensors, may send alerts to the user client device 300 responsive to data from the security sensors (e.g., data indicative of an intrusion), may output alerts to a monitoring service or monitoring center responsive to data from the security sensors, and/or may trigger an audible or other alarm (e.g., on the wireless speaker device 112) responsive to data from the security sensors. In various embodiments, the communication hub 116 may be configured to alter a state of the security system. For example, the communication hub may be configured to alter the state of the security system from an unarmed state, in which data from the security sensors, such as data indicative of a door or window being opened, is not indicative of an intrusion, to an armed state, in which data from one or more of the security sensors is indicative of an intrusion.

Figure 2:
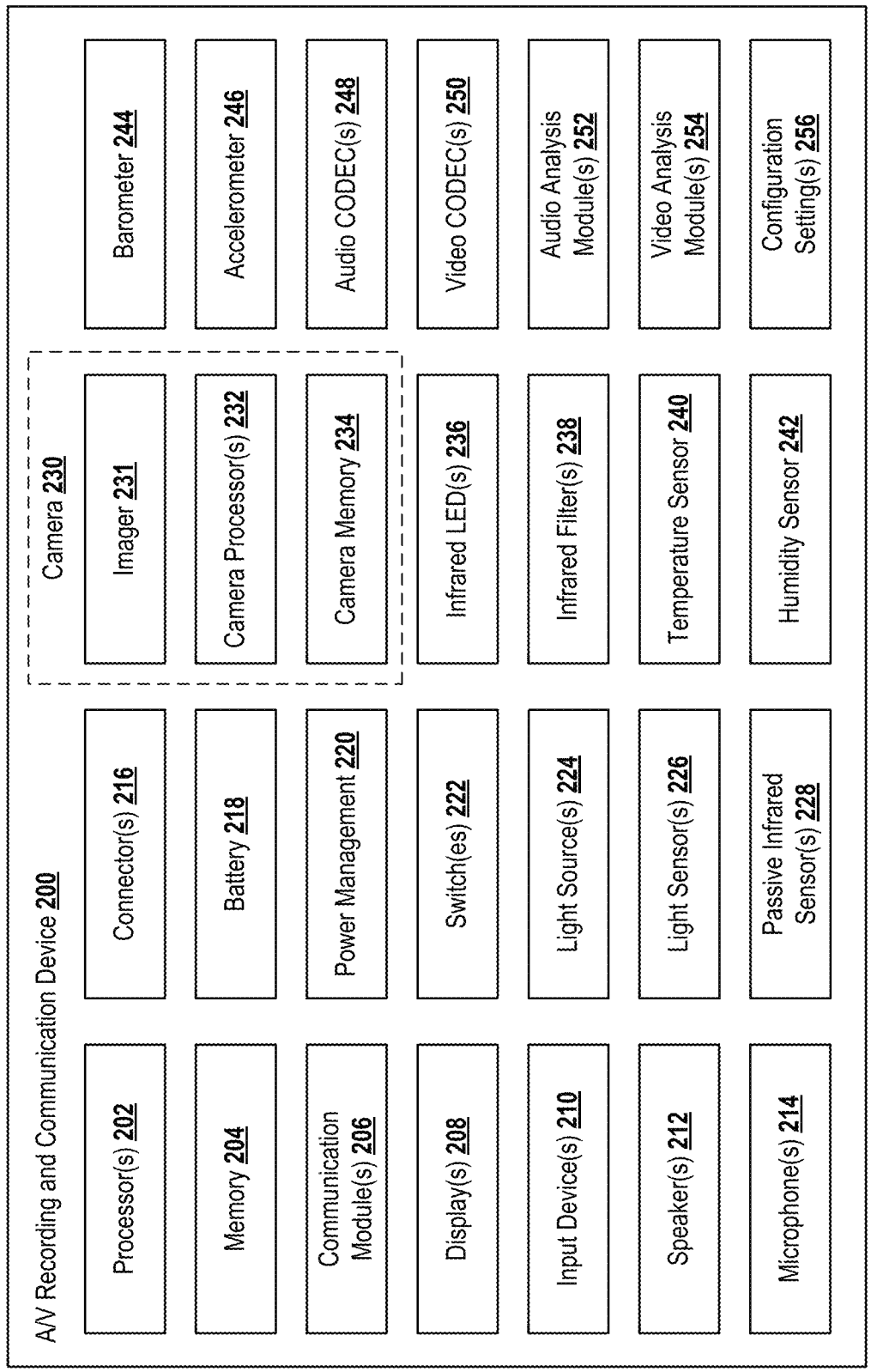
FIG. 2 is a functional block diagram of the components of the A/V recording and communication device of FIG. 1 according to various aspects of the present disclosure.

FIG. 2 is a functional block diagram of the components within or in communication with, an example audio/video (A/V) recording and communication device 200, according to an aspect of the present embodiments. The A/V recording and communication device 200 may include an accelerometer 246, a barometer 244, a humidity sensor 242, and a temperature sensor 240, which may collectively be embodied in a bracket printed circuit board (PCB), in some embodiments. The accelerometer 246 may be one or more sensors capable of sensing motion and/or acceleration. The barometer 244 may be one or more sensors capable of determining the atmospheric pressure of the surrounding environment in which the bracket PCB may be located. The humidity sensor 242 may be one or more sensors capable of determining the amount of moisture present in the atmospheric environment in which the bracket PCB may be located. The temperature sensor 240 may be one or more sensors capable of determining the temperature of the ambient environment in which the A/V recording and communication device may be located. In some embodiments, the bracket PCB or other implementation of the accelerometer 246, a barometer 244, a humidity sensor 242, and/or temperature sensor 240 may be located outside the housing of the A/V recording and communication device 200 so as to reduce interference from heat, pressure, moisture, and/or other stimuli generated by the internal components of the A/V recording and communication device 200.

The A/V recording and communication device 200 may also include a light sensor(s) 226, one or more light sources 224, such as LEDs, one or more speaker(s) 212, and a microphone(s) 214, one or more of which may be implemented on a front PCB, in an embodiment. The light sensor(s) 226 may be one or more sensors capable of detecting the level of ambient light of the surrounding environment in which the A/V recording and communication device 200 may be located. LEDs 156 may be one or more light-emitting diodes capable of producing visible light when supplied with power. The speaker(s) 212 may be any electromechanical device capable of producing sound in response to an electrical signal input. The microphone(s) 214 may include an acoustic-to-electric transducer or sensor capable of converting sound waves into an electrical signal. When activated, the LEDs may illuminate the one or more of the light sources 224.

The speaker(s) 212 and the microphone(s) 214 may be coupled to the camera processor 232 through one or more audio CODEC(s) 248. For example, the transfer of digital audio from the user's client device 300 and the speaker(s) 212 and the microphone(s) 214 may be compressed and decompressed using the audio CODEC(s) 248, coupled to the camera processor 232. Once compressed by the audio CODEC(s) 248, digital audio data may be sent through a communication module 206 to the network 118, routed by the one or more servers 124, and delivered to the user's client device 300. When the user speaks, after being transferred through the network 118, digital audio data is decompressed by the audio CODEC(s) 248 and emitted to the visitor via the speaker(s) 212.

The A/V recording and communication device 200 may further include one or more video CODEC(s) 250 and/or software instructions to leverage video CODEC(s) 250 for the purposes of compression and/or decompression of images and/or videos. In an example operation, the imager 231 captures light from a scene, which is then interpreted and processed by one or more camera processors 232 to convert captured light signals into raw image/video data. The camera processor(s) 232 and/or processor(s) 202 may then compress that raw image/video data using the one or more video CODEC(s) 250, to reduce the amount of data stored or transmitted by the A/V recording and communication device 200. Any combination of known video CODECs may be included within the video CODEC(s) 250. In some embodiments, the video CODEC(s) 250 alternatively or additionally includes special purpose or proprietary video CODEC(s).

With further reference to FIG. 2, the A/V recording and communication device 200 may further include a power management module 220, a processor(s) 202 (which may also be referred to as "microcontroller," "CPU," or "controller"), the communication module 206, and power PCB memory 204, one or more of which may be implemented on a main PCB or power PCB, in an embodiment. In certain embodiments, the power management module 220 may comprise an integrated circuit capable of arbitrating between multiple voltage rails, thereby selecting the source of power for the A/V recording and communication device 200. The battery 218 and/or the connector(s) 216 may each provide power to the power management module 220. The power management module 220 may have separate power rails dedicated to the battery 218, the spring contacts, and the connector(s) 216. The power management module 220 may also serve as a conduit for data between the connector(s) 216 and the processor(s) 202.

The connector(s) 216 may be electrically coupled with an AC/DC adapter, in some embodiments. The A/V recording and communication device 200 may thus be configured to connected to a source of external AC (alternating-current) power, such as a household AC power supply (which may also be referred to as AC mains). The AC power supply may provide a voltage in the range of 110-220 VAC, for example. The incoming AC power may be received at the connector(s) 216 from an AC/DC adapter, which may convert the incoming AC power to DC (direct-current) and may step down the voltage from 110-220 VAC to a lower output voltage of about 12 VDC and an output current of about 2 A, for example. In various embodiments, the output of an AC/DC adapter may be in a range of from about 9V to about 15V, for example, and in a range of from about 0.5 A to about 5 A, for example. These voltages and currents are only examples provided for illustration and are not limiting in any way.

With further reference to FIG. 2, in certain embodiments the processor(s) 202 may comprise an integrated circuit including a processor core, memory, and programmable input/output peripherals. The processor(s) 202 may receive input signals, such as data and/or power, from the passive infrared sensor(s) 228 (or any other type of motion sensor(s)), the bracket PCB, the power management module 220, the light sensor(s) 226, the microphone(s) 214, and/or the communication module 206, and may perform various functions as further described below. When the processor(s) 202 is triggered by the passive infrared sensor(s) 228, the processor(s) 202 may be triggered to perform one or more functions. When the light sensor(s) 226 detects a low level of ambient light, the light sensor(s) 226 may trigger the processor(s) 202 to enable "night vision," as further described below. The processor(s) 202 may also act as a conduit for data communicated between various components and the communication module 206.

The display(s) 208 may be any electronic video display, such as a liquid-crystal display (LCD). The display(s) 208 may permit the A/V recording and communication device 200 to show information to visitors, output status information of the A/V recording and communication device 200 for users, and/or otherwise serve to communicate information to people (e.g., display a message to a hearing-impaired visitor). In some implementations, the display(s) 208 include embedded therein a digitizer, capacitive layer, or a resistive layer that allows the display(s) 208 to act as a touchscreen.

The input device(s) 210 may be any kind of human interface device (HID) that receives input from a user and translates that input into computer-understandable information. Some example input units include a keyboard, a mouse, a touchpad, and/or a touchscreen, among other possible input devices. In some instances, the input device(s) 210 may refer to an on-screen keyboard or pointer device of a touchscreen. A user may interact with input device(s) 210 to enter a text input, and/or press a button (physical or virtual), which may trigger execution of a command. Regardless of the kind of input device used, the input device(s) 210 may provide an interface through which a user can interact with A/V recording and communication devices of the present application.

For example, in certain embodiments the camera memory 234 may comprise synchronous dynamic random access memory (SD RAM). Infrared LED(s) 236 may comprise light-emitting diodes capable of radiating infrared light. Infrared filter(s) 238 may comprise a system that, when triggered, configures the imager 230 to see primarily infrared light as opposed to visible light. When the light sensor(s) 226 detects a low level of ambient light (which may comprise a level that impedes the performance of the imager 230 in the visible spectrum), the infrared LED(s) 236 may shine infrared light through the A/V recording and communication device 200 enclosure out to the environment, and the infrared filter(s) 238 may enable the imager 230 to see this infrared light as it is reflected or refracted off of objects within the field of view of the A/V recording and communication device 200. This process may provide the A/V recording and communication device 200 with the "night vision" function mentioned above.

With further reference to FIG. 2, the communication module 206 may comprise an integrated circuit including processor core(s), memory, and programmable input/output peripherals. The communication module 206 may also be configured to transmit data wirelessly to a remote network device, and may include one or more transceivers (not shown). The communication module 206 may enable wired and/or wireless communication through one or more wired and/or wireless networks, such as, without limitation, Ethernet, Wi-Fi, cellular, Bluetooth, and/or satellite networks. The communication module 206 may receive inputs, such as power and/or data, from the camera PCB, the processor(s) 202, input device(s) 210 including buttons, and/or the power PCB memory 204. When one or more buttons are pressed, the communication module 206 may be triggered to perform one or more functions. When the reset button is pressed, the communication module 206 may be triggered to erase any data stored at the power PCB memory 204 and/or at the camera memory 234. The communication module 206 may also act as a conduit for data communicated between various components and the processor(s) 202. The power PCB memory 204 may comprise flash memory configured to store and/or transmit data. For example, in certain embodiments the power PCB memory 204 may comprise serial peripheral interface (SPI) flash memory.

In some embodiments, the A/V recording and communication device 200 includes switch(es) 222, which can selectively couple and decouple two or more electric terminals. For instance, switch(es) 222 may include a switch—controlled by processor(s) 202 or another component of the A/V recording and communication device 200—that serves to couple and decouple a light source with a power source. As a specific example, switch(es) 222 may include a relay that, when activated, energizes a flood light. Switch(es) 222 may include relays, transistors, manual switches, and/or some combination thereof.

Light source(s) 224 may include any type of light bulb, light emitting diode (LED), LASER, or other light source of any wavelength or combination of wavelengths. In some embodiments, light source(s) 224 includes infrared LEDs to provide non-human-detectable illumination of a scene, enabling a "night vision" function of the A/V recording and communication device 200. Other light source(s) 224 may provide information to a user or visitor (e.g., indicators for charging, recording, etc.). Some light source(s) 224 may serve as an alert or visual siren (e.g., alternating flashing LEDs). Any combination of light sources may be included within light source(s) 224 without departing from the scope of the present application.

The A/V recording and communication device 200 may include functionality for the local processing of information, without the need of a server or backend computing device. In some embodiments, the A/V recording and communication device 200 includes audio analysis module(s) 252, video analysis module(s) 254, and configuration settings 256, among other special purpose software units. Each of these modules may be stored as instructions and/or data on a memory device of the A/V recording and communication device 204, such as memory 204, EEPROMs, and/or other non-volatile memory thereon. The specific configuration and software used to instantiate these modules may be modifiable and updateable (e.g., may be updated from a remote computing device over a network).

The audio analysis module(s) 252 may be operable to analyze audio signals or digital audio data to extract or quantify qualities of those audio signals or digital audio data. In some cases, the audio analysis module(s) 252 might include analog electrical analysis prior to digitizing audio signals. As one example, audio analysis module(s) 252 may include analog filters (e.g., low-pass filters, high-pass filters, band-pass filters, etc.), which can isolate a particular range of frequencies within an audio signal prior to being digitized. Such analog filters may reduce latency and/or computational complexity required to perform spectral analysis.

The audio analysis module(s) 252 may also include one or more digital analysis modules. Such modules—which might use known audio analysis techniques and/or proprietary techniques described in greater detail herein—may conduct spectral analyses, statistical analyses (e.g., amount of randomness), or amplitude determinations (e.g., relative volume of a sound), among other analyses. Higher level functions may also be implemented within audio analysis module(s) 252. For instance, the audio analysis module(s) 252 may carry out pattern detection, pattern matching, speech detection, speaker identification, and/or other proprietary sound detection, which may be described in greater detail below.

The video analysis module(s) 254 may be configured to analyze images and/or video data to identify the contents of images/video, classify portions of images/videos with some label, and/or otherwise derive information from images and/or video for subsequent use thereof. For example, a particular triggering event (e.g., sounding an alarm) may occur based on the detection of a particular object within an image or video feed. Video analysis module(s) 254 provide image and video analysis tools that enable the A/V recording and communication device to perform local processing of captured images without the need for backend processing. Such "onboard" video processing may be preferred over backend processing in circumstances where transmission latency over a wide area network would substantially reduce the efficacy of a particular method. The video analysis module(s) 254 may generally perform "computer vision" operations, including known techniques and/or novel techniques as described herein.

In some cases, the audio analysis module(s) 252 and the video analysis module(s) 254 may include software libraries, circuits, CODECs, classifiers, filters, machine learning tools, and/or other modules that are commonly used in audio and/or video processing. In other cases, the audio analysis module(s) 252 and/or video analysis module(s) 254 are proprietary software and/or hardware modules that carry out application-specific audio/video analyses. For example, a particular module may be a classifier that determines whether a video frame represents a daytime scene or a nighttime scene. Such specific audio/video classifiers, models, or modules may be described in greater detail below.

The audio analysis module(s) 252 and the video analysis module(s) 254 may further include modules for compressing audio and/or video data. For instance, an audio segment may be compressed by reducing the bitrate of that audio segment, thereby shrinking the amount of data representing that audio segment at the cost of audio quality. Likewise, a video clip may be compressed by reducing a video clip's resolution and/or its per-pixel bitrate (e.g., color depth). In other cases, a video clip might be compressed using "P-frame" or "delta-frame" techniques, in which only changes between successive video frames are encoded. Any type of audio/video compression techniques may be employed on the A/V recording and communication device 200 without departing from the scope of the present disclosure.

The A/V recording and communication device 200 may also thereon include configuration setting(s) 256. In some embodiments, the configuration setting(s) 256 represent the "state" of the A/V recording and communication device 200. For example, the A/V recording and communication device 200 may be placed into an "armed" mode when its owner is away from home. A configuration file, flag, or the like may be modified, which might affect some aspects of the A/V recording and communication device's 200 operation. For instance, an A/V recording and communication device 200 in "armed" mode may produce a siren sound in response to a triggering event, which would not otherwise occur if the A/V recording and communication device 200 was not in the "armed" mode.

The configuration setting(s) 256 may also represent a particular configuration, parameters, weightings, or other settings of a quantitative model, classifier, machine learning algorithm, or the like. As one example, a support vector machine (SVM) may be represented as a hyperplane that divides two regions of vector space into two respective classifications. The coefficients defining the hyperplane may be included within the configuration setting(s) 256. As another example, an artificial neural network (ANN) may comprise a set of interconnected nodes, with specific weights between each node connection. These connection weights may also be included within the configuration setting(s) 256.

The A/V recording and communication device 200 may carry out methods for detecting a particular audio event or a particular object within a video frame. In some implementations, the A/V recording and communication device 200 includes a classifier or machine learning algorithm that is executed locally on processor(s) 202. The parameters or weightings of the classifier or machine learning algorithm—that is, configuration setting(s) 256—may be updated (e.g., received from a computing device via the communication module(s) 206). Thus, the configuration setting(s) 256 may include parameters, coefficients, or weightings that enable or improve the audio analysis module(s) 252 and the video analysis module(s) 254 to carry out particular tasks, as may be described in greater detail herein.

In some cases, various embodiments of the processor(s) 202 and/or memory 204 may include thereon instructions that, upon execution, implement computer vision and/or image or video analysis functions. Alternatively, or additionally, the A/V recording and communication device 200 might include one or more integrated circuits in communication with the processor(s) 202 to carry out aspects of computer vision functions, such as object recognition, image or video compression, and/or face detection, among other functions.

As described herein, "computer vision" refers to methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIG. 3, embodiments of the present A/V recording and communication device 200 may include a computer vision module. The computer vision module may include any of the components (e.g., hardware) and/or functionality described herein with respect to computer vision, including, without limitation, one or more cameras, sensors, and/or processors. In some of the present embodiments, the microphone 246, the camera, and/or the imaging processor 240 may be components of the computer vision module.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; estimation of application-specific parameters, such as object pose or object size; image recognition—classifying a detected object into different categories; image registration—comparing and combining two different views of the same object. Decision making—Making the final decision required for the application, for example match/no-match in recognition applications.

One or more of the present embodiments may include a vision processing unit (which may be a component of the computer vision module). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many-core DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches: geometric, which looks at distinguishing features; or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the video analysis module(s) 254, the imager 230, and/or the processor(s) 202 or 232 may receive information about the person using any one, or any combination of more than one, of the foregoing biometrics.

Additionally, or alternatively, the A/V recording and communication device 200 may also transmit captured audio/video to a computing device, such as a backend server, over a network for subsequent processing thereof. Such a backend server may, in some cases, conduct audio, image, and/or video analyses to determine the presence or absence of some object or event. If a detection is made, the backend server may then transmit messages to the A/V recording and communication device 200, a client device 300, and/or other devices. In some instances, transmitted audio/video may be stored in a storage device (e.g., in a database), to serve as training data for the purpose of generating and/or improving a classifier or machine learning tool.

With further reference to FIG. 2, the A/V recording and communication device 200 may comprise components that facilitate the operation of a camera. For example, an imager 230 may comprise a video recording sensor and/or a camera chip. In one aspect of the present disclosure, the imager 230 may comprise a complementary metal-oxide semiconductor (CMOS) array, and may be capable of recording high definition (e.g., 720p, 2120p, etc.) video files. A camera processor 232 may comprise an encoding and compression chip. In some embodiments, the camera processor 232 may comprise a bridge processor. The camera processor 232 may process video recorded by the imager 230 and audio recorded by the microphone(s) 214, and may transform this data into a form suitable for wireless transfer by the communication module 206 to a network. The camera memory 234 may comprise volatile memory that may be used when data is being buffered or encoded by the camera processor 232. For example, in certain embodiments the camera memory 234 may comprise synchronous dynamic random access memory (SD RAM). Infrared LED(s) 236 may comprise light-emitting diodes capable of radiating infrared light. Infrared filter(s) 238 may comprise a system that, when triggered, configures the imager 230 to see primarily infrared light as opposed to visible light. When the light sensor(s) 226 detects a low level of ambient light (which may comprise a level that impedes the performance of the imager 230 in the visible spectrum), the Infrared LED(s) 236 may shine infrared light through the A/V recording and communication device 200 enclosure out to the environment, and the Infrared filter(s) 238 may enable the imager 230 to see this infrared light as it is reflected or refracted off of objects within the field of view of the doorbell. This process may provide the A/V recording and communication device 200 with the "night vision" function mentioned above.

Figure 3:
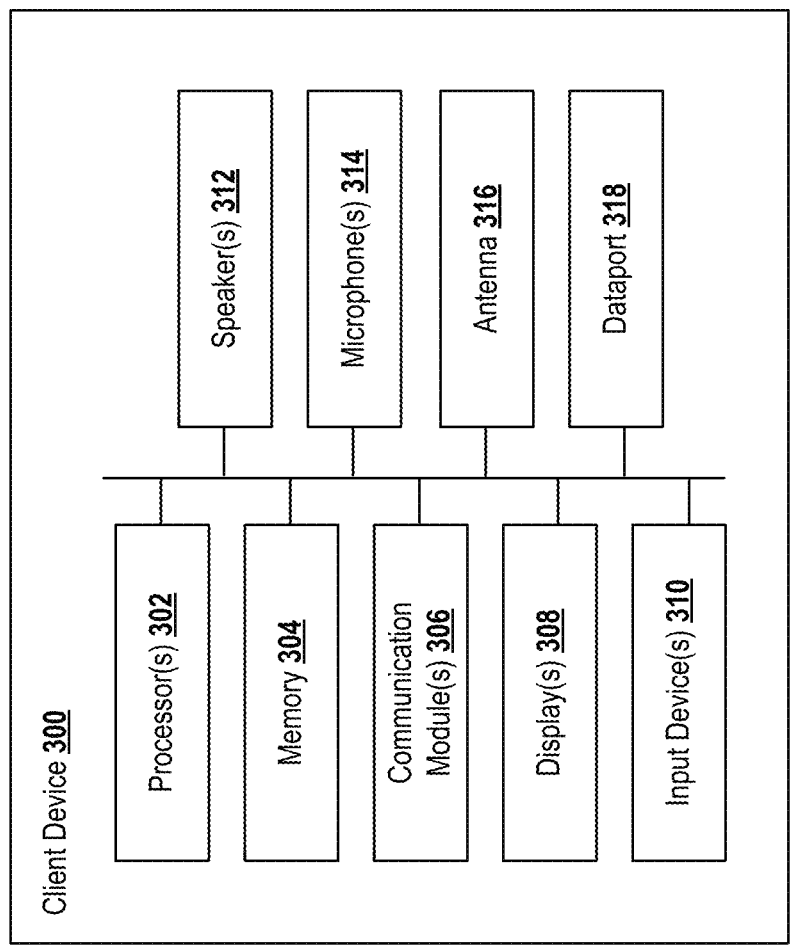
FIG. 3 is a functional block diagram of a client device on which the present embodiments may be implemented according to various aspects of the present disclosure.

FIG. 3 is a functional block diagram of an example client device 300 on which the present embodiments may be implemented according to various aspects of the present disclosure. The user's client device 300 described with reference to FIG. 1 may include some or all of the components and/or functionality of the client device 300 illustrated in FIG. 3. The client device 300 may comprise, for example, a smartphone.

With reference to FIG. 3, the example client device 300 includes a processor(s) 302, a memory 304, a display(s) 308, a communication module(s) 306, input device(s) 310, speaker(s) 312, microphone(s) 314, connector(s) 316, battery 318, and a dataport 318. These components are communicatively coupled together by an interconnect bus. The processor(s) 302 may include any processor used in smartphones and/or portable computing devices, such as an ARM processor (a processor based on the RISC (reduced instruction set computer) architecture developed by Advanced RISC Machines (ARM).). In some embodiments, the processor(s) 302 may include one or more other processors, such as one or more conventional microprocessors, and/or one or more supplementary co-processors, such as math co-processors.

The memory 304 may include both operating memory, such as random access memory (RAM), as well as data storage, such as read-only memory (ROM), hard drives, flash memory, or any other suitable memory/storage element. The memory 304 may include removable memory elements, such as a CompactFlash card, a MultiMediaCard (MMC), and/or a Secure Digital (SD) card. In some embodiments, the memory 304 may comprise a combination of magnetic, optical, and/or semiconductor memory, and may include, for example, RAM, ROM, flash drive, and/or a hard disk or drive. The processor(s) 302 and the memory 304 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor(s) 302 may be connected to the memory 304 via the dataport 318.

The display(s) 308 may include any user interface or presentation elements suitable for a smartphone and/or a portable computing device, such as a keypad, a display screen, a touchscreen, a microphone, and a speaker. The communication module(s) 306 is configured to handle communication links between the client device 300 and other, external devices or receivers, and to route incoming/outgoing data appropriately. For example, inbound data from the dataport 318 may be routed through the communication module(s) 306 before being directed to the processor(s) 302, and outbound data from the processor(s) 302 may be routed through the communication module(s) 306 before being directed to the dataport 318. The communication module(s) 306 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 318 may be any type of connector used for physically interfacing with a smartphone and/or a portable computing device, such as a mini-USB or USB-C port or an IPHONE®/IPOD® 30-pin connector or LIGHTNING® connector. In other embodiments, the dataport 318 may include multiple communication channels for simultaneous communication with, for example, other processors, servers, and/or client terminals.

The memory 304 may store instructions for communicating with other systems, such as a computer. The memory 304 may store, for example, a program (e.g., computer program code) adapted to direct the processor(s) 302 in accordance with the present embodiments. The instructions also may include program elements, such as an operating system. While execution of sequences of instructions in the program causes the processor(s) 302 to perform the process steps described herein, hard-wired circuitry may be used in place of, or in combination with, software/firmware instructions for implementation of the processes of the present embodiments. Thus, the present embodiments are not limited to any specific combination of hardware and software.

The input device(s) 310 may include any combination of hardware and/or software elements that receive user input and/or facilitate the interpretation of received input. Input device(s) 310 may be hardware (e.g., physical buttons and switches), software (e.g., virtual buttons, sliders, etc.), or some combination thereof (e.g., software-controlled haptic feedback for simulating button clicks). In some instances, input device(s) 310 includes a touchscreen or touch-based digitizer. Input device(s) 310 may include a virtual keyboard or other virtual input elements as well.

The speaker(s) 312 may include any combination of speakers or other sound-emitting devices. The speaker(s) 312 may be operable to produce a variety of sounds, such as audio from live video, notification or alert sounds, or other audible sounds.

The microphone(s) 314 may include any combination of transducers that convert pressure waves into electrical signals. The microphone(s) 314 may capture audio, which may, in some instances, be transmitted to a separate computing device or server. That transmitted audio may then be relayed to an A/V recording and communication device 200 (e.g., to provide a substantially live audio transmission to a video doorbell).

The antenna 316 may enable the client device 300 to communicate wirelessly. For instance, the antenna 316 permits the client device 300 to communicate over cellular networks, via one or more communication standards (e.g., GSM, CDMA, LTE, etc.). The antenna 316 may allow the client device 300 to communicate over other wireless protocols, such as Wi-Fi or Bluetooth, among other wireless protocols. The antenna 316 may include multiple antennae, depending on the particular implementation.

In addition to the above, the client device 300 may include a variety of other components, such as batteries, connectors, light indicators, cameras, and sensors, among other components.

Figure 4:
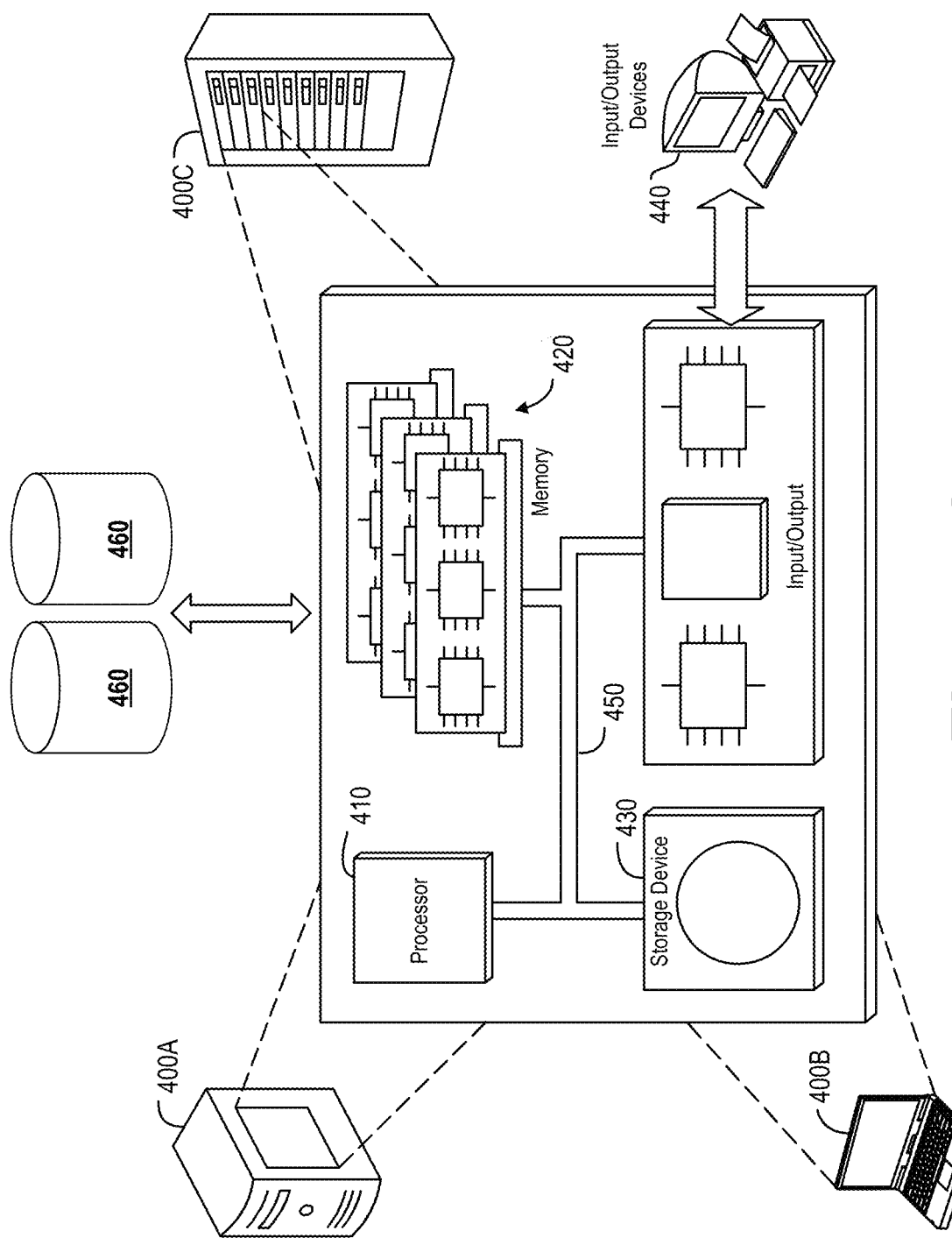
FIG. 4 is a functional block diagram of a general-purpose computing system on which the present embodiments may be implemented according to various aspects of present disclosure.

FIG. 4 is a functional block diagram of a general-purpose computing system on which the present embodiments may be implemented according to various aspects of the present disclosure. The computer system 400 may be embodied in at least one of a personal computer (also referred to as a desktop computer) 400A, a portable computer (also referred to as a laptop or notebook computer) 400B, and/or a server 400C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 400 may execute at least some of the operations described above. The computer system 400 may include at least one processor 410, memory 420, at least one storage device 430, and input/output (I/O) devices 440. Some or all of the components 410, 420, 430, 440 may be interconnected via a system bus 450. The processor 410 may be single- or multi-threaded and may have one or more cores. The processor 410 may execute instructions, such as those stored in the memory 420 and/or in the storage device 430. Information may be received and output using one or more I/O devices 440.

The memory 420 may store information, and may be a computer-readable medium, such as volatile or non-volatile memory. The storage device(s) 430 may provide storage for the system 400, and may be a computer-readable medium. In various aspects, the storage device(s) 430 may be a flash memory device, a hard disk device, an optical disk device, a tape device, or any other type of storage device.

The I/O devices 440 may provide input/output operations for the system 400. The I/O devices 440 may include a keyboard, a pointing device, and/or a microphone. The I/O devices 440 may further include a display unit for displaying graphical user interfaces, a speaker, and/or a printer. External data may be stored in one or more accessible external databases 460.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Figure 5A:
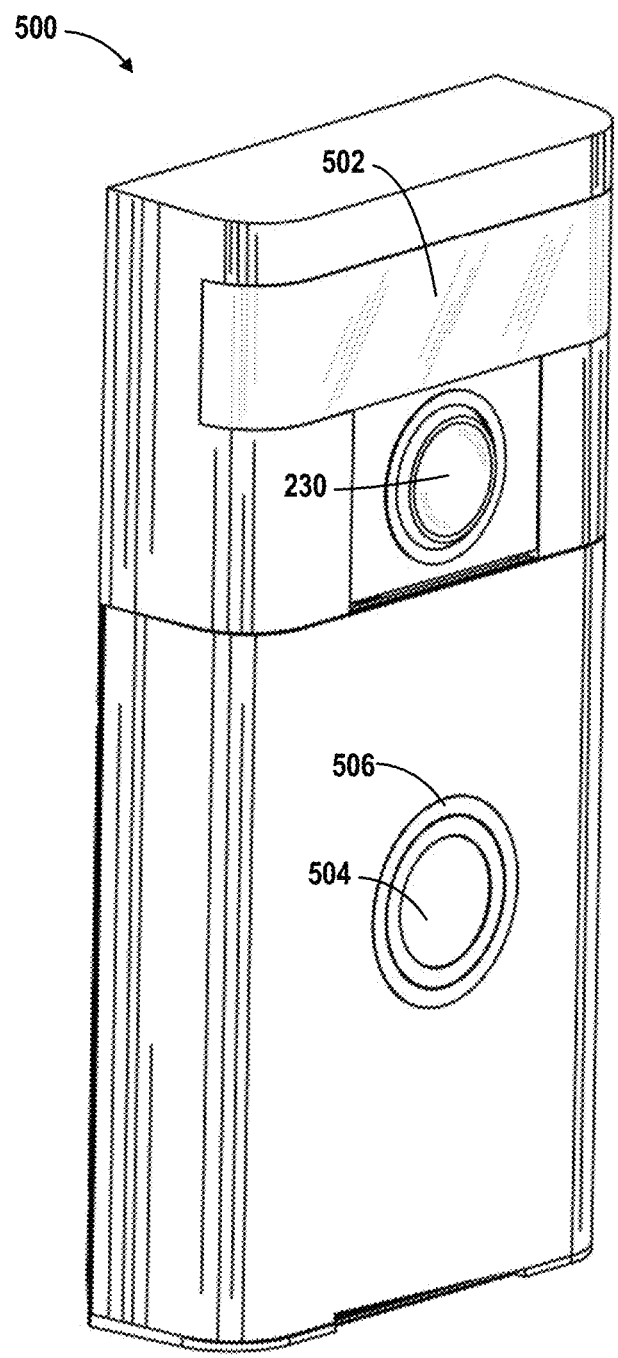
FIGS. 5A-5C depict example A/V recording and communication devices according to various aspects of the present disclosure.
Figure 5B:
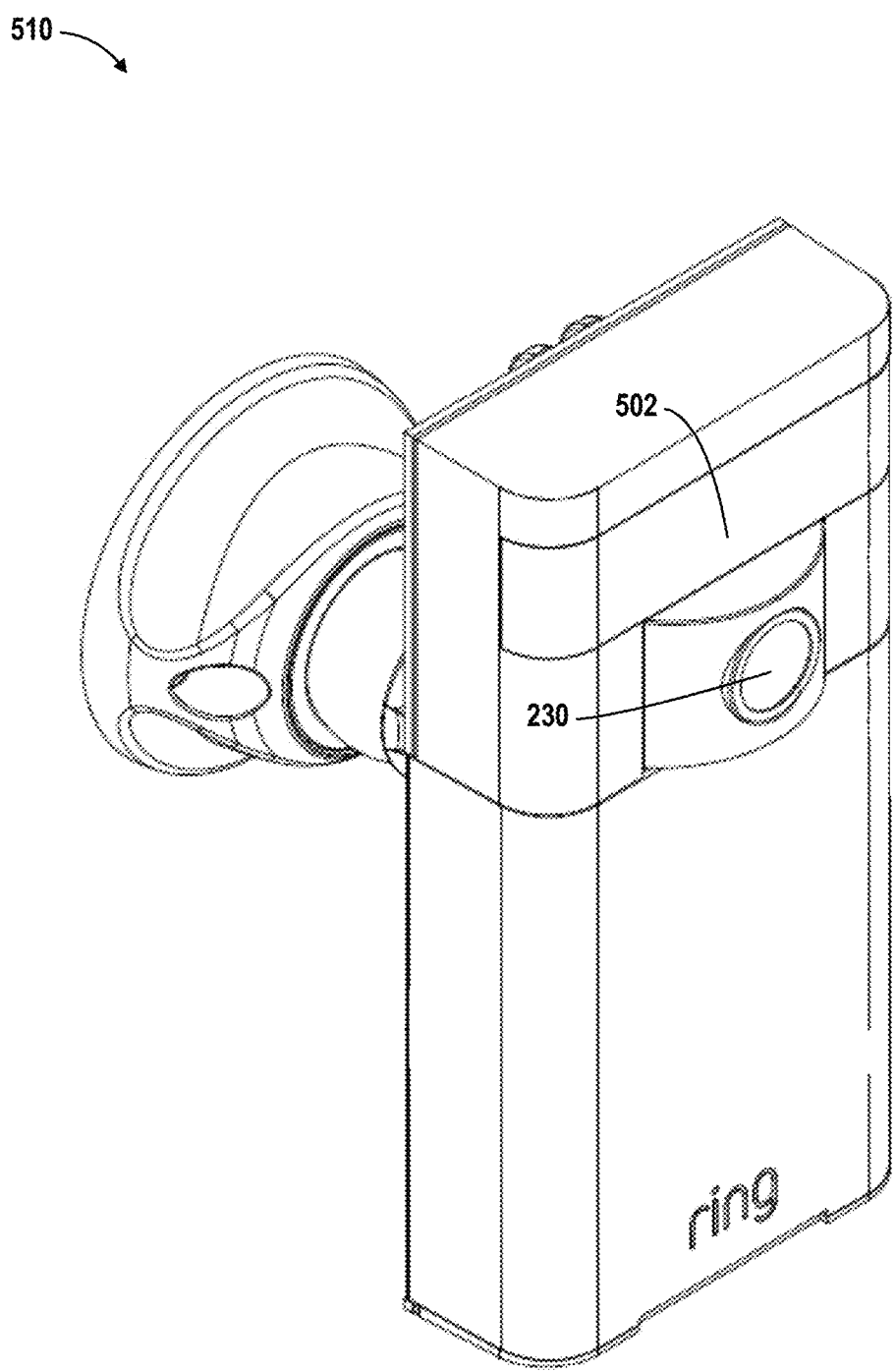
Figure 5C:
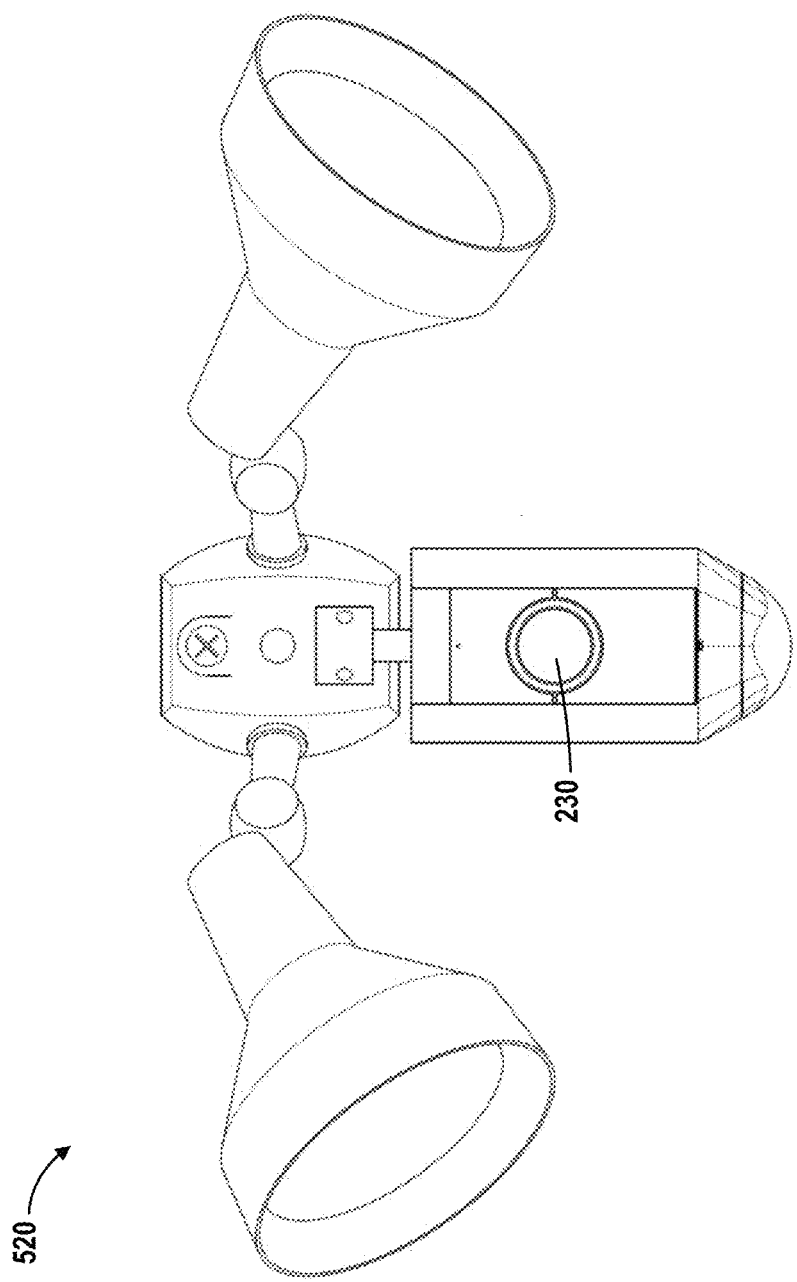

FIGS. 5A, 5B and 5C depict example A/V recording and communication devices 500, 510, 520. A/V recording and communication device 500 (FIG. 5A) may be referred to herein as a "video doorbell" or some variant thereof. A/V recording and communication device 510 (FIG. 5B) may be referred to herein as a "security cam" or some variant thereof. A/V recording and communication device 520 (FIG. 5C) may be referred to herein as the "floodlight cam," "spotlight cam," or some variant thereof. The A/V recording and communication devices 500, 510, 520 may be embodiments of the A/V recording and communication device 200 described with respect to FIG. 2, and thus may each include some or all of the elements of A/V recording and communication device 200. The A/V recording and communication devices 500, 510, 520 may also include additional hardware and/or software elements not explicitly contemplated in the present disclosure. Although FIGS. 5A-5C illustrate example A/V recording and communication device implementations, other form factors, shapes, mounting hardware, arrangement of components, or aesthetic aspects may be used without departing from the scope of the present disclosure.

Each of the video doorbell 500, security cam 510, and floodlight cam 520 may include a camera 230 that captures video data when activated. The video doorbell 500 and security cam 510 may further include a lens 502. In some embodiments, the lens 502 may comprise a Fresnel lens, which may be patterned to deflect incoming light into one or more infrared sensors located within the video doorbell 500 or security cam 510 (e.g., the passive infrared sensors 226 (FIG. 2)).

The video doorbell 500 may further include a button 504 and a light pipe 506. The button 504 may make contact with a button actuator (not shown) located within the video doorbell 500 when the button 504 is pressed by a visitor. When pressed, the button 504 may trigger one or more functions of the doorbell 500, such as producing an audible alert, transmitting a notification to a user, etc. The light pipe 506 may allow light produced within the doorbell 500 (e.g., by the light source(s) 224 (FIG. 2)) to pass through.

In the following detailed description, video frame modification techniques are described as affecting the amount of data (e.g., the bitrate) of individual video frames. Reducing the size of video data may involve at least two types of compression: individual frame compression (e.g., I-frames), and frame-by-frame compression (e.g., P-frames). Individual frame compression may involve reducing the amount of data within a single frame. Frame-by-frame compression may generally describe techniques that reduce video bitrate by storing frame data as the changes between successive frames (rather than storing an independent image for each individual frame). Video frame modification techniques of the present disclosure generally involve reducing the amount of data within a particular frame. In some embodiments, these data-reducing techniques may be applied in tandem with other video compression techniques to further reduce the bitrate of a video.

Figure 6:
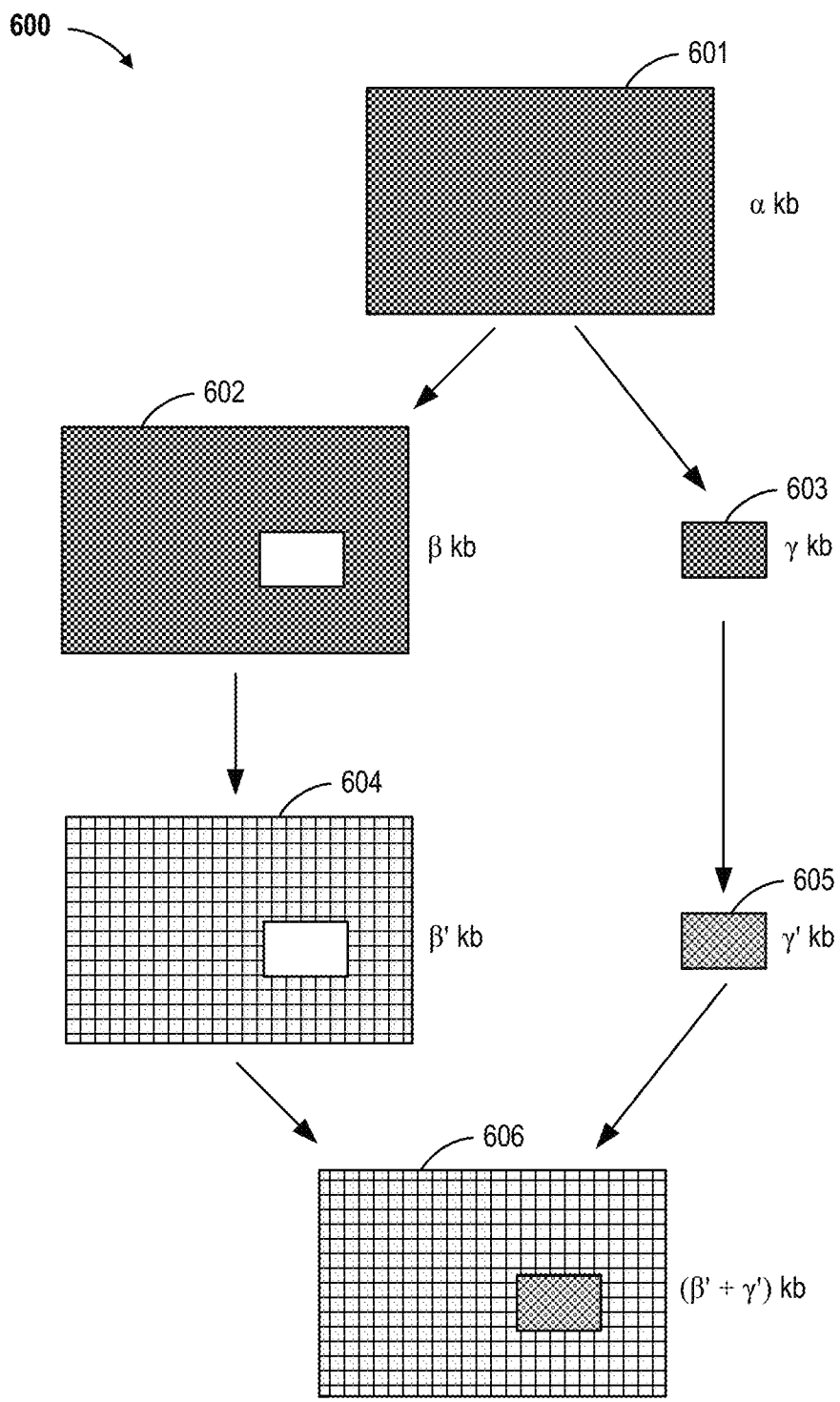
FIG. 6 is a conceptual diagram illustrating an example video frame modification technique, according to an aspect of the present disclosure.

FIG. 6 is a conceptual diagram 600 illustrating an example video frame modification technique. The variables, values, proportions, and number of steps shown in FIG. 6 are provided for explanatory purposes to facilitate understanding of the present disclosure, and do not limit the scope of this disclosure to a particular embodiment.

In an example scenario, the per-frame available bandwidth between the A/V recording and communication device 200 and server 124 is X kb. The camera 230 of the A/V recording and communication device 200 captures a frame 601, which is initially α kb. The A/V recording and communication device 200 may first determine that α kb exceeds X kb, and therefore cannot be transmitted without reducing the data size of the frame 601.

The A/V recording and communication device 200, the communication hub 116, and/or the server 124 may then, using an object recognition engine, determine that a portion of interest 603 is present within the frame 601. The portion of interest 603 may be, in some implementations, objects that may be used to identify a person, such as the person's face, distinct markings on the person's clothing, logos on the person's clothing and/or vehicle, a license plate present in the video frame, and/or other objects.

Pixels of the frame 601 representing the portion of interest 603 are processed separately from the remaining pixels of the frame 601 containing the environment portion 602. As shown in the diagram 600, the environment portion is initially β kb in size, and the portion of interest 603 is initially γ kb in size. Without any modification to either of the environment portion 602 and the portion of interest 603, the sum of β kb and γ kb is equal to α kb.

In this example, the portion of interest 603 is shown to be rectangular. Some object recognition engines may be configured to detect the presence of an object within a rectangular portion of a frame. However, other object recognition engines may be configured to detect the presence of objects in a set of pixels in the shape of a rotated rectangle or other shapes. Furthermore, some object recognition engines may perform edge detection or other feature detection techniques to identify a more precise set of pixels that contain an object of interest that is not a basic geometric shape. In the present embodiments, the shape of the portion of interest 603 is not limited to any specific geometric shape.

Subsequent to determining that a portion of interest 603 is present within the frame 601, the A/V recording and communication device 200, the communication hub 116, and/or the server 124 modifies the quality of at least the environment portion 602 to produce a modified environment portion 604 having a data size of β' kb, which is less than β kb. Modifying the quality of the environment portion 602 may involve reducing the color depth of its pixels, reducing the resolution of the environment portion 602, transforming the color space of the pixels (e.g., RGB to YCbCr), or some combination thereof, among other types of quality modification.

In some cases, reducing the resolution of a portion of a frame may involve effectively reducing the resolution, while not reducing the number of pixels present within the frame. For example, the resolution of the portion of the frame may be reduced by setting the color value of a set of neighboring pixels to the same color (e.g., the average color of that set of neighboring pixels), which can be subsequently compressed (e.g., using run length encoding or the like) to reduce the amount of data used to represent the portion of the frame, even though the particular video frame's resolution may not change.

In some embodiments, the degree to which the quality of the environment portion 602 is reduced may depend on the available bandwidth. For instance, in embodiments where the quality of the portion of interest 603 is not modified, the data size β' kb of the modified environment portion 604 should be less than or equal to the available bandwidth minus the data size γ kb of the portion of interest 603 (β'≤X−γ). Mathematical equivalences can be used to determine the data reduction ratio for the environment portion 604

$$\left(\frac{\beta'}{\beta} \le \frac{X - \alpha + \beta}{\beta}\right).$$

Other methods may be used to determine the degree to which quality of the environment portion 602 and/or the portion of interest 603 is reduced.

The ratio between the data size β' kb of the modified environment portion 604 and the data size β kb of the portion of interest 603 may be determined such that the sum of the data size β' kb of the modified environment portion 604 and the data size γ' kb of the modified portion of interest 605 is less than the available bandwidth X kb. In an example implementation, the modified portion of interest 605 may be of the same quality as the portion of interest 603, such that no data reduction occurs and γ' kb is equal to γ kb. In this example implementation, the requisite data size β' kb of the modified environment portion 604 may be determined, and may subsequently serve as the basis for determining the manner and/or degree to which the quality of the environment portion 603 is reduced.

In another example, the qualities of both the modified environment portion 604 and the modified portion of interest 605 may be reduced. For instance, a particular implementation may designate a maximum threshold amount of quality reduction. If, after applying such a maximum threshold amount of quality reduction to the environment portion 603, it is determined that combined data size β' kb of the modified environment portion 604 and the data size γ kb of the portion of interest 603 still exceeds the available bandwidth X kb, then some amount of quality reduction may be applied to the portion of interest 603. In various implementations, the degree of quality reduction applied to the portion of interest 603 is less than or equal to the degree of quality reduction applied to the environment portion 602, such that the quality of the portion of interest 603 is generally prioritized over that of the environment portion 602.

As described herein, "quality reduction" may refer generally to a modification of the data representing an image or a frame, regardless of whether the color, resolution, or other aspect of image quality is apparently or actually reduced. For instance, color space transformation (e.g., from RGB to YCbCr) may not necessarily result in a perceivable change in image quality. Reducing or modifying a frame's quality may also involve compressing an image using one or more known and/or proprietary compression techniques, which may affect one or more aspects of an image or frame's quality.

Regardless of the particular implementation, the modified portion of interest 605 (which may or may not differ in quality from that of the portion of interest 603) and the modified environment portion 604 are then combined to form a modified frame 606 (FIG. 6) having a data size of (β'+γ') kb. Combining the modified environment portion 604 and the modified portion of interest 605 may involve overlaying one portion onto the other, stitching together the two portions, or other image combining or merging techniques. The modified frame 606, having a smaller data size compared to the original frame 601, may then be transmitted to a separate computing device for subsequent processing and/or storage.

Figure 7A:
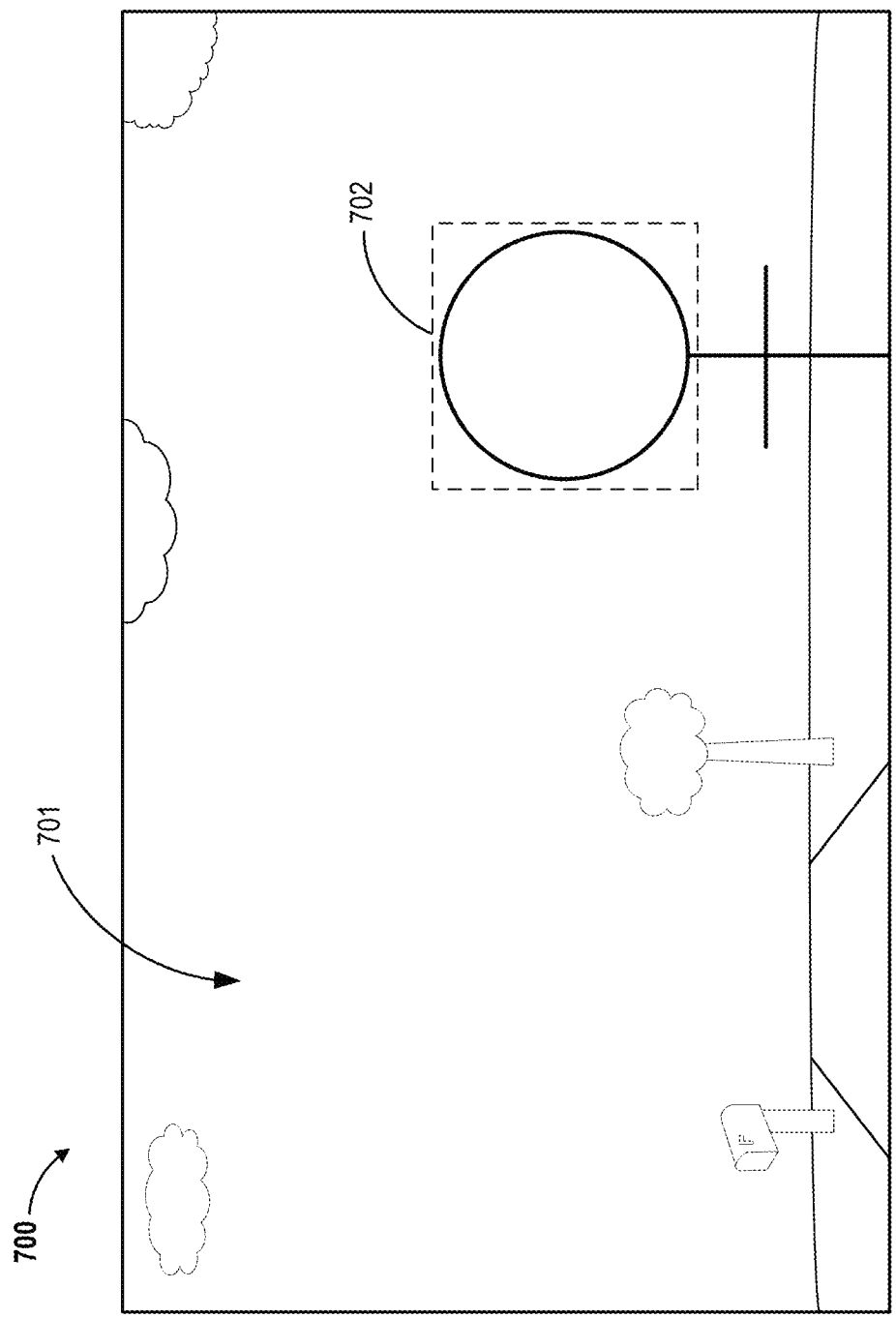
FIGS. 7A-7B are example video frames containing at least one object of interest, according to an aspect of the present disclosure.
Figure 7B:
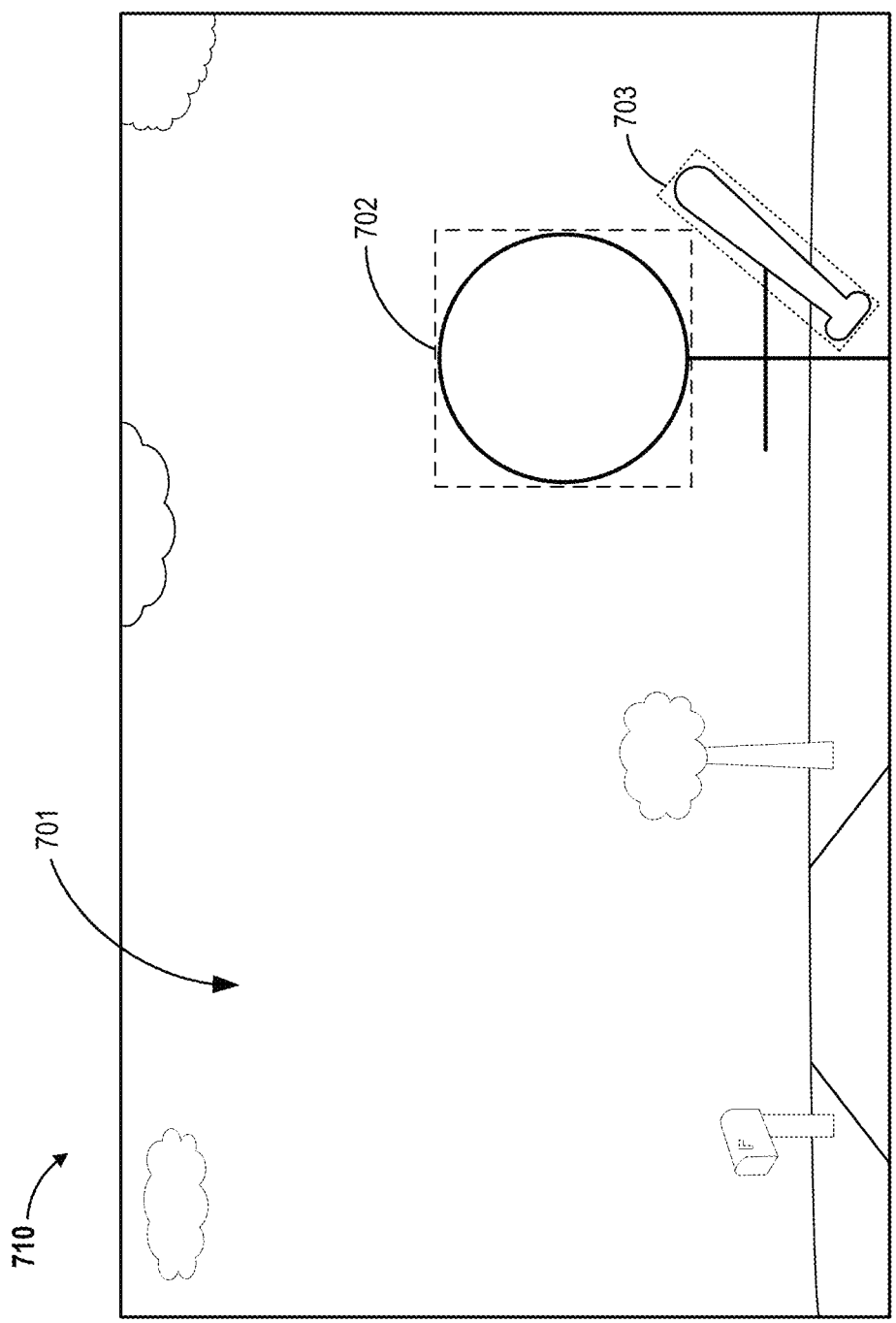

FIGS. 7A-7B illustrate example frames 700 and 710 with which techniques of the present disclosure may be applied. The frames 700 and 710 are provided for explanatory purposes only, and may not necessarily be drawn to scale.

Referring to FIG. 7A, the frame 700 includes an environment portion 701 and a face portion 702. In this example, the environment portion 701 includes a driveway, a mailbox, a tree, and clouds in the background, while the face 702 includes a person's face. An object recognition engine may be configured to detect the presence of a person's face within the frame 700, and identify the set of pixels (which are contained within the dashed-line box of the face portion 702) that contain the person's face.

Using techniques of the present disclosure, the A/V recording and communication device 200, the communication hub 116, and/or the server 124 may modify or reduce the quality of the environment portion 701, while maintaining the quality of the face portion 702 (or reducing the quality of the portion of interest 702 by a lesser amount compared to that of the environment portion 701). In this manner, the details of the person's face within the face portion 702 are prioritized over the environment portion 701. Such prioritization may preserve identifying details of the person's face to assist in subsequent law enforcement investigations, for example.

Referring to FIG. 7B, the frame 710 is similar to the frame 700, and includes the environment portion 701 and the face portion 702. However, in this example, an additional portion of interest 703 is identified, which includes a baseball bat portion 703. In some implementations, the A/V recording and communication device 200, the communication hub 116, and/or the server 124 may be configured to detect the presence of one or more objects of interest, such as weapons, burglary tools (e.g., crowbars), or other suspicious or threatening items. The detection of such an object of interest may trigger or affect subsequent video frame modification that is applied to the frame 710. For instance, the presence of the baseball bat portion 703 may cause any video frame modifications to prioritize quality of the face portion 702 and/or the baseball bat portion 703. The objects of interest may include any kind of object that is generally associated with illicit activity, such as guns, crowbars, and lock picks, among other possible objects.

FIGS. 8A-10B are example video frames that illustrate the frame modification techniques of the present application. In each example, the "A" Figure illustrates an original quality frame, while the "B" figure illustrates a modified version of the original frame. Although the frames shown in FIGS. 8A-10B are shown in grayscale, quality modifications within the scope of the present embodiments may involve reducing the color depth and/or transforming the color space. Additionally, in each of the following examples shown in FIGS. 8A-10B, the respective portions of interest are shown and described to maintain the same quality before and after the frame is modified. However, some implementations may involve modifying both the environment portion and the portion of interest to some degree. The following examples depict the portions of interest maintaining their original quality for the purposes of explanation, to facilitate an understanding of the techniques of the present disclosure.

Figure 8B:
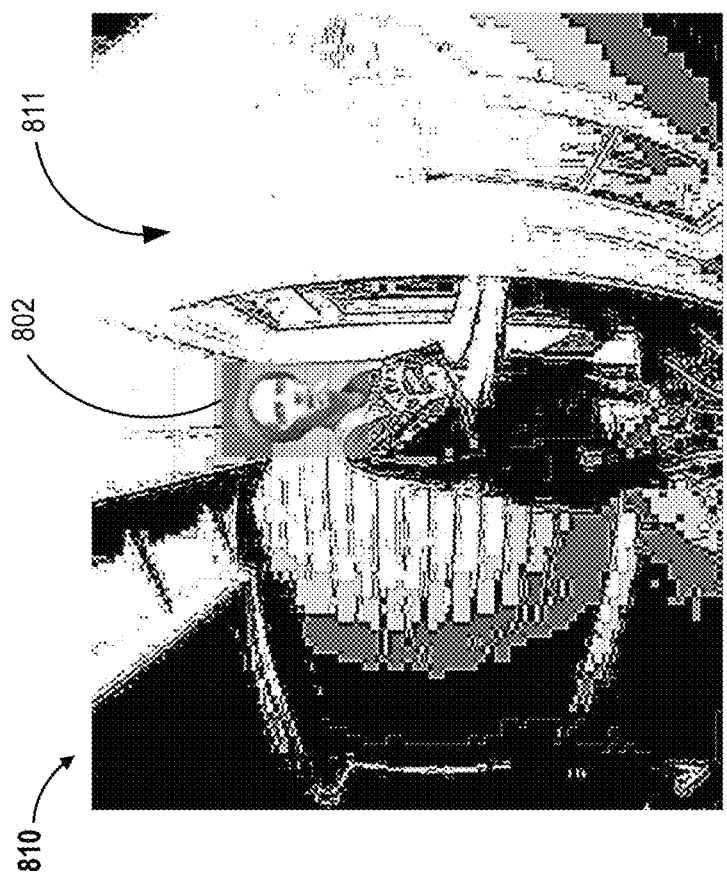
FIGS. 8A-8B are example video frames illustrating a video frame modification technique, according to an aspect of the present disclosure.
Figure 8A:
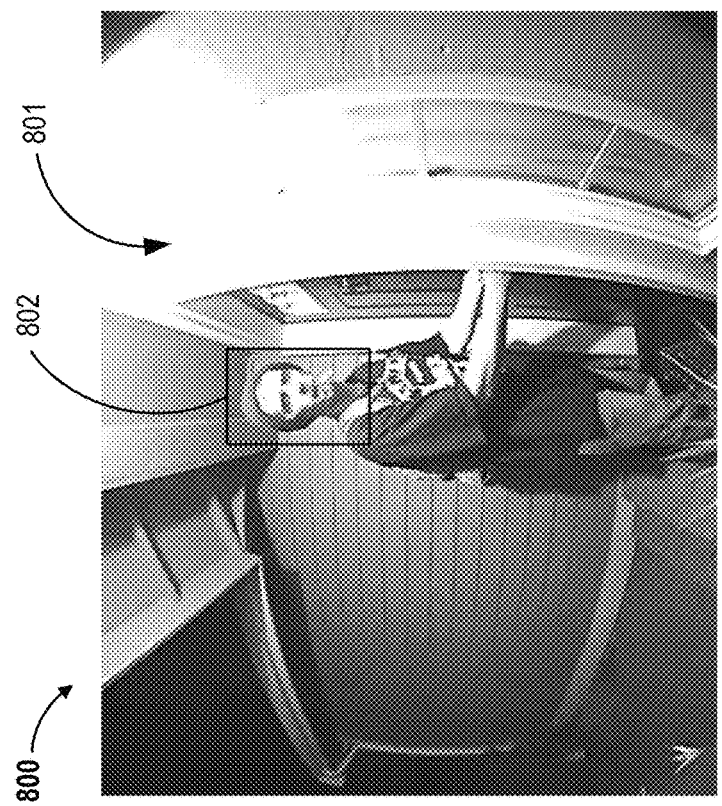

FIGS. 8A-8B are example video frames 800 and 810 that depict a person attempting to break into a house through the front door. The frame 800 of FIG. 8A is an original quality frame, which contains an environment portion 801 and a face portion 802. In this example, the environment portion 801 includes a house, its front door, the front steps, parts of the house, and parts of the person's clothing, while the face portion 802 includes the person's face.

After these portions 801, 802 have been determined, the quality of the environment portion 801 is substantially reduced to produce a modified environment portion 811. The frame 810 of FIG. 8B is a combination of the modified environment portion 811 and the unmodified face portion 802. As shown in FIG. 8B, details of the house, the front door, the window, and the steps within the modified environment portion 811 are more difficult to resolve compared to the environment portion 801 of FIG. 8A. However, the face portion 802 remains preserved in its original quality in the frame 810, such that details of the person's face can be resolved.

In other implementations (not illustrated), the face portion 802 may be expanded to include the person's upper torso, which includes a graphic t-shirt containing potentially identifiable text and/or logos. Additionally or alternatively, the face portion 802 may be expanded to include the person's arms, which are shown to be attempting to open the door.

Figure 9B:
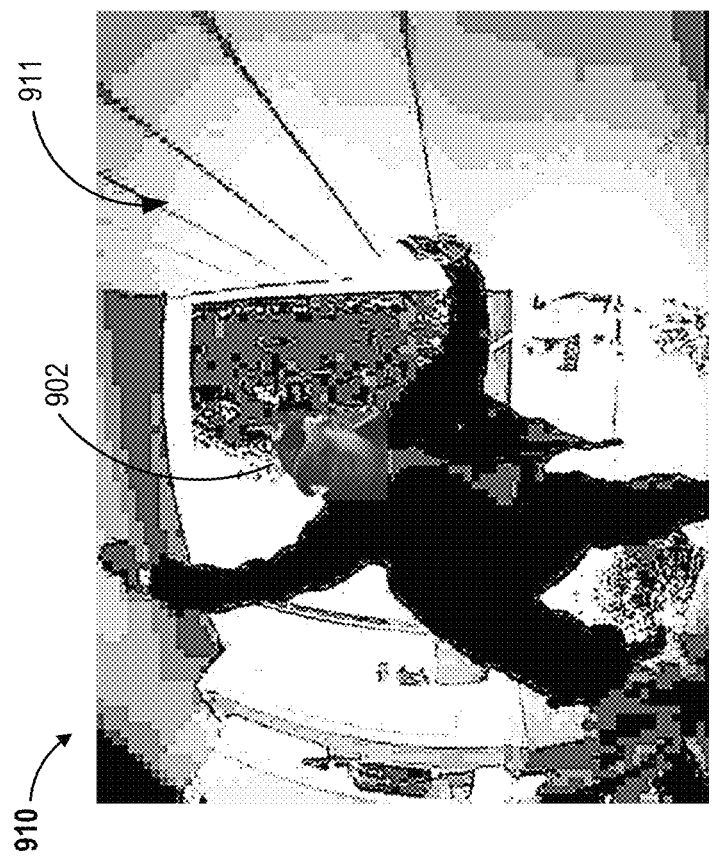
FIGS. 9A-9B are example video frames illustrating another video frame modification technique, according to an aspect of the present disclosure.
Figure 9A:

FIGS. 9A-9B are example video frames 900 and 910 that depict a person attempting to break into a house through the front door by forcibly kicking in the door. In some embodiments, an object recognition engine or other hardware and/or software module may be configured to detect suspicious behavior or behavior indicative of criminal activity. In this example, the object recognition engine or other hardware and/or software module initially determines that the person is attempting to break into the home by kicking in the door. Such behavior may be detected based on the person's movement or stance, for example.

The frame 900 of FIG. 9A is an original quality frame, which contains an environment portion 901 and a face portion 902. In this example, the environment portion 901 includes parts of the house, the front porch, the street, and trees, while the face portion 902 includes the person's face. After these portions 901, 902 have been determined, the quality of the environment portion 901 is substantially reduced to produce a modified environment portion 911. The frame 910 of FIG. 9B is a combination of the modified environment portion 911 and the unmodified face portion 902. As shown in FIG. 9B, details of the house, the front door, the window, and the steps within the modified environment portion 911 are more difficult to resolve compared to the environment portion 901 of FIG. 9A. However, the face portion 902 remains preserved in its original quality in the frame 910, such that details of the person's face can be resolved.

Figure 10B:
FIGS. 10A-10B are example video frames illustrating another video frame modification technique, according to an aspect of the present disclosure.
Figure 10A:
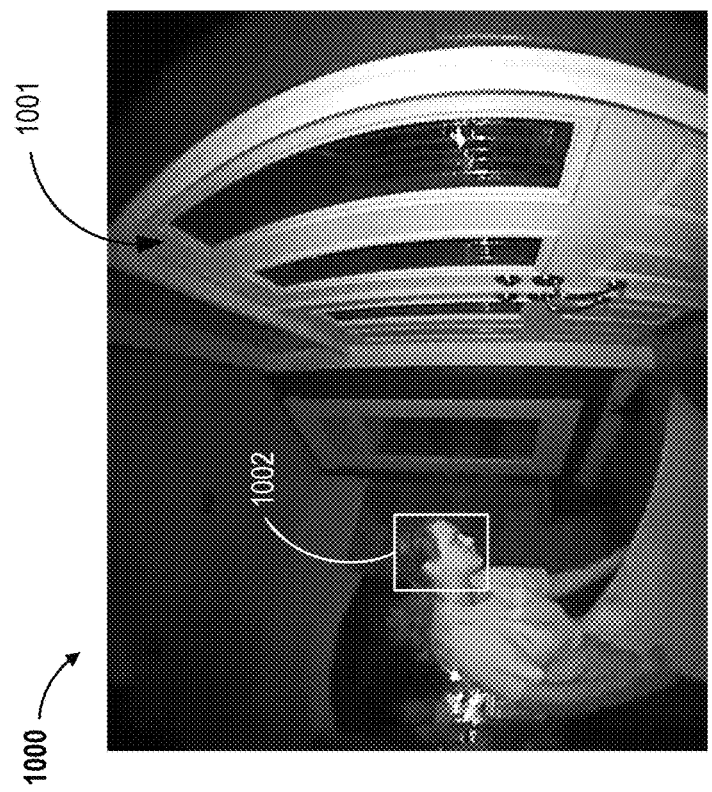

FIGS. 10A-10B are example video frames 1000 and 1010 that depict a person searching for a key concealed under a doormat. As with the previous example, the object recognition engine or other hardware and/or software module may be configured to detect suspicious behavior. This example illustrates activity that may or may not necessarily be "criminal," but is suspicious or may potentially lead to criminal activity (e.g., using a hidden key to unlock the front door of the home).

The frame 1000 of FIG. 10A is an original quality frame, which contains an environment portion 1001 and a face portion 1002. In this example, the environment portion 1001 includes parts of the house, the front porch, the street, and trees, while the face portion 1002 includes the person's face. After these portions 1001, 1002 have been determined, the quality of the environment portion 1001 is substantially reduced to produce a modified environment portion 1011. The frame 1010 of FIG. 10B is a combination of the modified environment portion 1011 and the unmodified face portion 1002. As shown in FIG. 10B, details of the house, the front door, and the window within the modified environment portion 1011 are more difficult to resolve compared to the environment portion 1001 of FIG. 10A. However, the face portion 1002 remains preserved in its original quality in frame 1010, such that details of the person's face can be resolved.

In the example shown in FIGS. 10A-10B, the behavior of searching for and using a hidden key may or may not trigger subsequent processes, such as notifying at least one person who resides at the location of the A/V recording and communication device 200 and/or law enforcement. As a specific example, a user's son or daughter may perform the same activity if they return home without a key. Thus, prior to the triggering of alerts, alarms, or notifications, the face portion 1002 may be compared against one or more "trusted" faces associated with the A/V recording and communication device 200 (e.g., the faces of the user's children). If the face portion 1002 is determined to be a trusted face, then no alarms or notifications may be triggered. Regardless of the implementation, the example shown in FIGS. 10A-10B illustrates the desire to prioritize face details in certain video frames to not only preserve identifying details of criminal activity, but also to enhance the robustness of a home security system.

Figure 11:
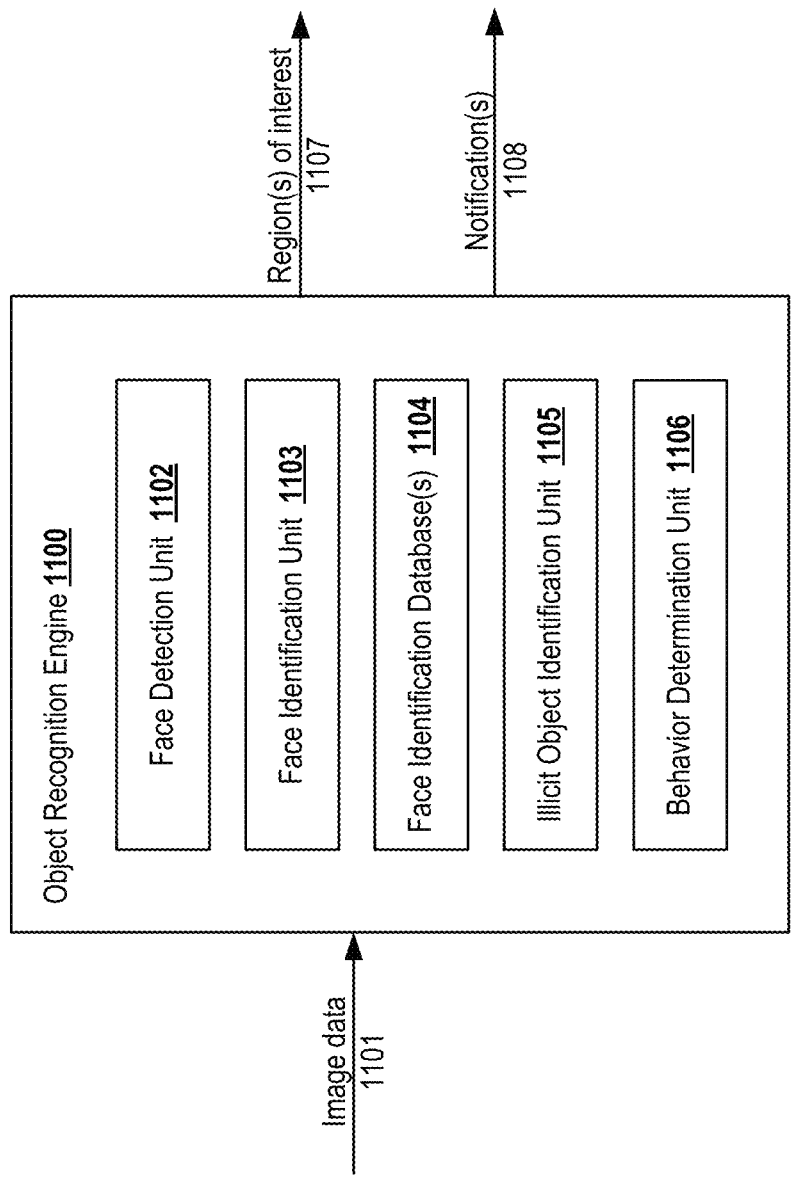
FIG. 11 is a functional block diagram of an example object recognition engine, according to an aspect of the present disclosure.

FIG. 11 is a block diagram of an object recognition engine 1100, according to an aspect of the present disclosure. The object recognition engine 1100 shown and described with respect to FIG. 11 may serve as the object recognition engine described in other examples herein. The object recognition engine 1100 includes a face detection unit 1102, a face identification unit 1103, face identification database(s) 1104, an illicit object identification unit 1105, and a behavior determination unit 1106. Each of these elements may include a combination of hardware and/or software, and may be implemented on the A/V recording and communication device 200, the communication hub 116, and/or the server 124.

The object recognition engine 1100 receives image data 1101, and outputs region(s) of interest 1107 and notification(s) 1108. The image data 1101 may be the data of one or more video frames. The object recognition engine 1100 may include a storage element for temporarily or permanently storing the image data 1101. Successive video frames may be stored and used to detect particular types of change-dependent information, such as particular movements or behaviors.

The face detection unit 1102 may be configured to detect the presence and location of faces within a frame. As described herein, face "detection" refers to the determination that a face is present within a frame, while face "identification" refers to an attempt to determine the identity of the person using image data of that person's face. The face detection unit 1102 may be integrated with the A/V recording and communication device 200 and/or the communication hub 116 to detect the presence of a face or faces in near-real time without backend processing. The face detection unit 1102 may use known face detection techniques, or proprietary face detection methods.

The face identification unit 1103 may be configured to associate detected faces with a particular identity. In some implementations, the face identification unit 1103 may receive a portion of a frame output by the face detection unit 1102 that represents a person's face. The face identification unit 1103 may use a combination of techniques to determine whether a detected face matches a face in the face identification database(s) 1104, such as edge detection, machine learning tools, neural networks, and/or other computer vision tools.

The face identification database(s) 1104 may store data indicative of a set of faces, each associated with an identity and/or other information. As a specific example, the face identification database(s) 1104 may store registered faces associated with "trusted" individuals designated as such by a user. A user (e.g., an owner of the A/V recording and communication device 200 or any other person associated with the A/V recording and communication device 200) may wish to register family members, trusted mail carriers or delivery persons, close friends, and/or extended family members with a home security system. Each registered person may undergo a training process, by which one or more images of that person's face are captured to be processed and stored in association with an identity.

The "identity" of the person may or may not be a specific name of a person. As one implementation, a person's face may simply be designated as "trusted" or "not trusted" in the face identification database(s) 1104. In another implementation, the person's face may be associated with a relation to the user (e.g., son, daughter, wife, mail carrier, etc.). Regardless of the particular implementation, the face identification database(s) 1104 may be configured to preserve the privacy of individuals.

In the above example, the face identification database(s) 1104 is configured to store faces associated with or known by the user. However, in other cases, the face identification database(s) 1104 may include other people not specifically registered by, associated with, or known by the user. For example, the face identification database(s) 1104 may include a set of faces associated with known or at-large persons of interest. The face identification unit 1103 could be configured to alert the user and/or law enforcement upon identifying a detected face to be associated with a known criminal or other person at-large.

The face identification unit 1103 and/or the face identification database(s) 1104 may be integrated on the A/V recording and communication device 200, the communication hub 116, and/or on the server 124. In an example implementation, the face detection unit 1102 operating onboard the A/V recording and communication device 200 first detects the presence of a face within a video frame. That video frame, along with data indicating the portion of the frame containing the face (e.g., the portion of interest as described in examples above) is transmitted to the communication hub 116 or the server 124. The communication hub 116 or server 124, having thereon the face identification unit 1103 and the face identification database(s) 1104, may then carry out subsequent face identification processing. Such an implementation may be desired where the processing power of the A/V recording and communication device 200 is insufficient to carry out face identification quickly.

However, in some implementations, the A/V recording and communication device 200 may include thereon the face identification unit 1103 and at least a portion of the face identification database(s) 1104. For instance, the face identification unit 1103 onboard the A/V recording and communication device 200 may be configured to initially determine whether the face of a person in a captured video frame is a trusted person designated by the user and stored in the face identification database(s) 1104 within the A/V recording and communication device 200. Thus, some implementations may integrate face identification of trusted persons on the A/V recording and communication device 200, without subsequent processing by either the communication hub 116 or the backend server 124. Such an implementation may be desired for privacy reasons.

The illicit object identification unit 1105 may include one or more object detectors or classifiers, which are each configured to detect the presence of a particular object (e.g., a crowbar, a gun, etc.) or a class of objects (e.g., weapons). Such object detection may involve a combination of computer vision and/or machine learning techniques (e.g., classifiers, support vector machines, neural networks, etc.). One or more separate classifiers or networks may be included within the illicit object identification unit 1105, and may perform separate object classifications in parallel.

The behavior determination unit 1106 may include one or more classifiers, neural networks, or other machine learning tools configured to detect one or more types of behavior from one or more video frames. Referring to the example of FIGS. 9A-9B, one behavior may be the use of force to open a door by kicking or shoving. Such behavior may be determined based on a person's stance, or the relative location of the person's feet with respect to their arms or head. Additionally or alternatively, the "forcible entry by kicking" behavior may be determined from two or more frames, such as from sudden movement of a person's foot off the ground.

Referring to the example of FIGS. 10A-10B, another behavior detectable by the behavior determination unit 1106 may be a search for items around a user's front door. As with the previous example, this type of behavior may be determined based on a person's crouched or bent-over stance, upward and downward movement of the person, or the displacement of environment objects (e.g., moving rugs, planters, etc.).

Other examples of detectable behavior include an unknown person taking packages from a user's front porch, attempting to obscure or block the view of an A/V recording and communication device's camera, peering through a user's windows, and stuffing or concealing stolen items in a jacket or sweatshirt, among other types of behavior.

With reference to FIG. 11, the region(s) of interest 1107 may specify a set of pixels, a boundary of pixels (e.g., coordinates), or other portions of a frame that contain an object of interest. The region(s) of interest 1107 may include the location of a face within the image data 1101 detected by the face detection unit 1102. The region(s) of interest 1107 may also include other portions of the image data 1101, such as a person's clothing, vehicle, and weapons or other illicit objects carried by the person. The region(s) of interest 1107 may serve to partition a video frame for subsequent quality modification, as described herein.

The notification(s) 1108 may be any type of message representative of an identified face, object, behavior, or information associated with those identifications. An example notification may be that a detected face could not be identified, and thus represents an "unknown" person. Another example notification may be that a detected face was identified as the user's spouse, and thus represents a "known" or "trusted" person (to the extent that the user's spouse is registered in the face identification database(s) 1104).

The notification(s) 1108 may also be directed to third parties. For instance, a person identified as at at-large criminal may trigger the transmission of a notification to law enforcement. Such a notification may include information about the detected person's identity and/or the location of the detection (e.g., the user's address).

Figure 12:
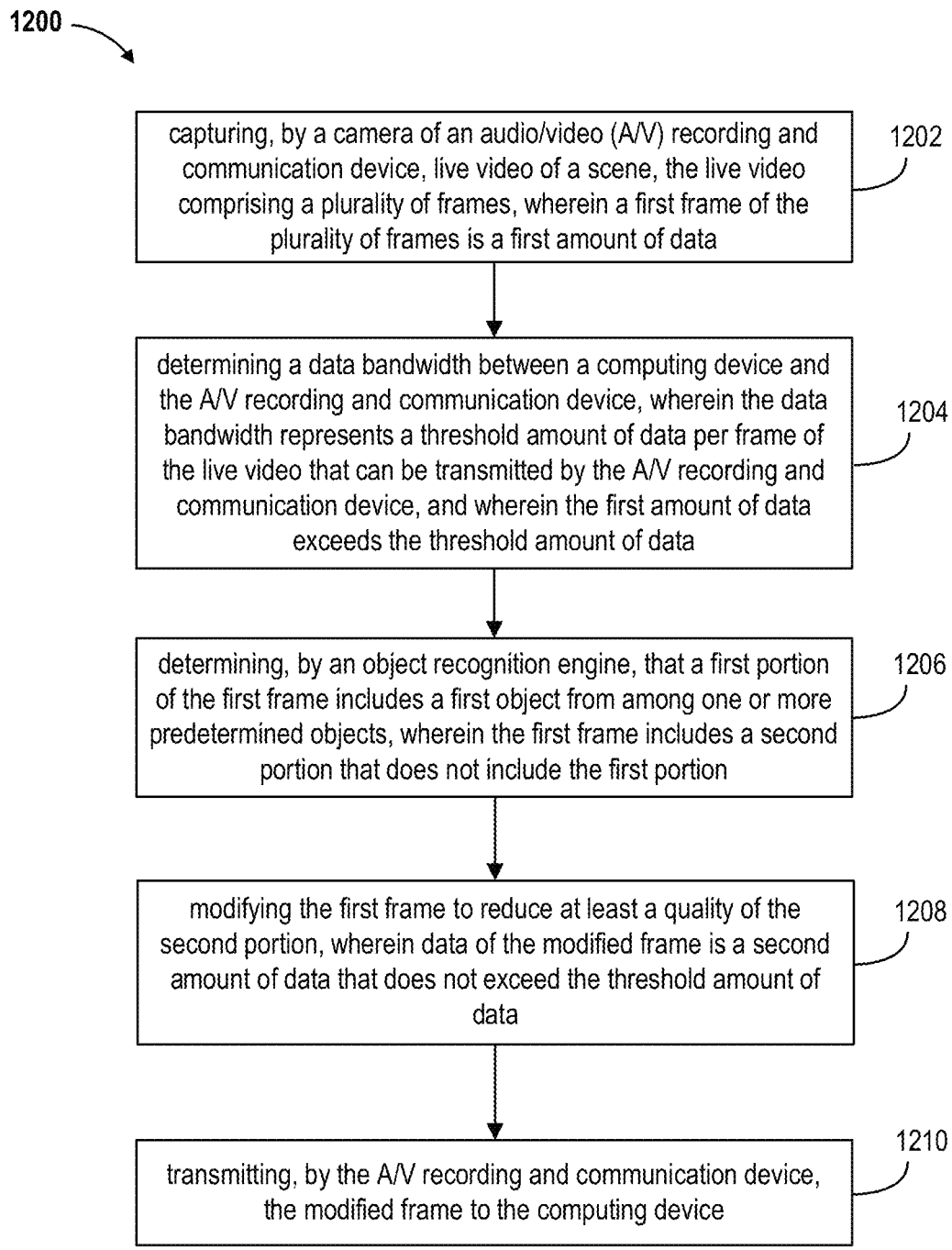
FIG. 12 is a flowchart of an example video frame modification method, according to an aspect of the present disclosure.

FIG. 12 is a flowchart of an example video frame modification method 1200 according to the present embodiments. Blocks 1202-1210 may be performed by the A/V recording and communication device 200, the communication hub 116, the server 124, another computing device, or some combination thereof. For the purposes of the following description, blocks 1202-1210 are described as being performed by the A/V recording and communication device 200.

At block 1202, the A/V recording and communication device 200 captures live video of a scene. The live video comprises a plurality of frames, and a first frame of the plurality of frames is a first amount of data. As described herein, "live" video refers to capturing video in real time or near-real time. The live video is represented as a plurality of successive frames.

At block 1204, the A/V recording and communication device 200 determines a data bandwidth between a computing device and the A/V recording and communication device

200. The data bandwidth, also referred to herein as the "available bandwidth," refers to a threshold amount of data that can be transmitted by the A/V recording and communication device 200 to the computing device per frame. Live video may be represented by a plurality of frames that are successively displayed over a duration of time. The data bandwidth of the method 1200 refers to a threshold amount of data for the first frame (e.g., for a bandwidth of 30 Mb/s and video at 30 fps, the per-frame data bandwidth is 1 Mb/s). Here, the first amount of data of the first frame exceeds the threshold amount of data of the data bandwidth.

At block 1206, the A/V recording and communication device 200 determines, by an object recognition engine, that a first portion of the first frame includes a first object from among one or more predetermined objects. The object recognition engine may be the same as or similar to the object recognition engine 1100 of FIG. 11. The first object may be an object of interest, such as a face or an illicit object, as described above. The one or more predetermined objects may be any object or class of objects designated as an object of interest. Using terms described above, the first portion may be a "portion of interest." The first frame also includes a second portion, or the "environment portion," which is the portion of the first frame without the portion of interest.

At block 1208, the A/V recording and communication device 200 modifies the first frame to reduce at least a quality of the second portion. The degree and manner of quality reduction may depend on a variety of factors and may vary among different applications, as described above. The "modification" of the frame at block 1208 may involve altering a copy of the first frame and/or a copy of the second portion, and does not necessarily involve overwriting the first frame data. After block 1208, the modified frame is a second amount of data that is less than the first amount of data, and does not exceed the threshold amount of data.

At block 1210, the A/V recording and communication device 200 transmits the modified frame to the computing device. The modified frame may be combined into a single image or video frame, or may be transmitted as two or more separate image portions. The modified frame may also include metadata, such as the location and boundaries of one or more objects of interest for subsequent processing (e.g., face identification).

Although blocks 1202-1210 are shown in a particular order, in various embodiments two or more blocks may be performed in parallel, or in a different order. Additionally, the method 1200 may include additional blocks, depending on the particular implementation. For example, the method 1200 may also include blocks for modifying the first portion of the first frame, to further reduce the amount of data of the modified frame. Other blocks are also possible.

Figure 13:
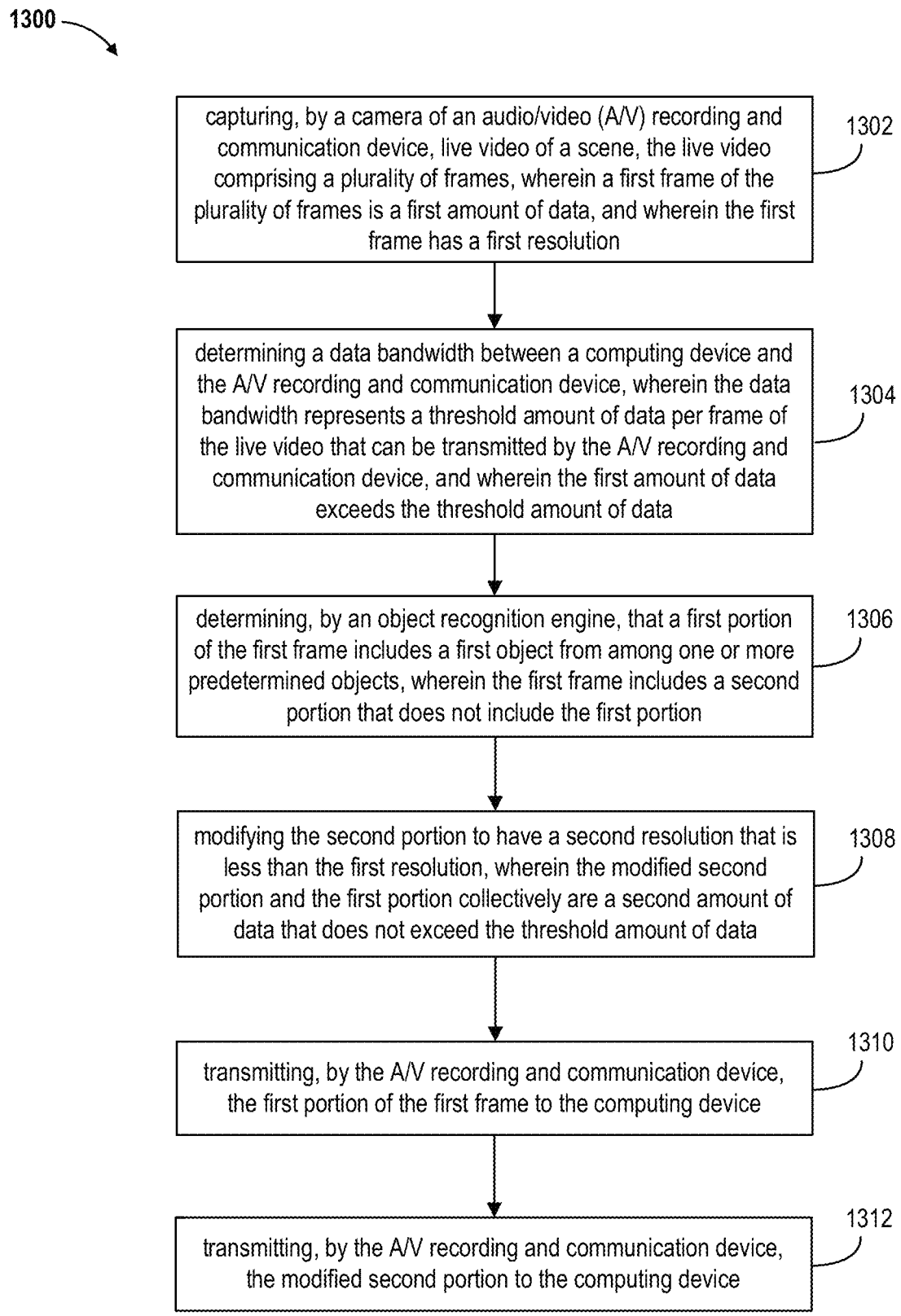
FIG. 13 is a flowchart of another example video frame modification method, according to an aspect of the present disclosure.

FIG. 13 is a flowchart of another example video frame modification method 1300 according to the present embodiments. Blocks 1302-1312 may be performed by the A/V recording and communication device 200, the communication hub 116, the server 124, another computing device, or some combination thereof. For the purposes of the following description, blocks 1302-1312 are described as being performed by the A/V recording and communication device 200.

At block 1302, the A/V recording and communication device 200 captures live video of a scene that comprises a plurality of frames. The first frame of the plurality of frames is a first amount of data and has a first resolution. As described herein, a "resolution" may refer to pixel resolution, spatial resolution, or an "effective" resolution (e.g., where neighboring pixels are set to the same color value, resulting in an effective resolution reduction while the number of pixels remains the same).

At block 1304, the A/V recording and communication device 200 determines a data bandwidth between a computing device and the A/V recording and communication device 200. The data bandwidth represents a threshold amount of data per frame of the live video that can be transmitted by the A/V recording and communication device 200 to the computing device. The first amount of data exceeds the threshold amount of data, such that the first frame at the first resolution cannot be transmitted to the computing device.

At block 1306, the A/V recording and communication device 200 determines, by an object recognition engine, that a first portion of the first frame includes a first object from among one or more predetermined objects. The object recognition engine may be the same as or similar to the object recognition engine 1100 of FIG. 11. Using terms described above, the first portion may be a "portion of interest." The first frame also includes a second portion, or the "environment portion," which is the portion of the first frame without the portion of interest.

At block 1308, the A/V recording and communication device 200 modifies the second portion of the first frame to have a second resolution, which is less than the first resolution. The modified second portion may have fewer pixels, a lower spatial resolution, and/or may have a lower effective resolution, as described above. The combination of the modified second portion and the first portion collectively are a second amount of data, which is less than the first amount of data and does not exceed the threshold amount of data.

At block 1310, the A/V recording and communication device 200 transmits the first portion of the first frame to the computing device. At block 1312, the A/V recording and communication device 200 transmits the modified second portion of the first frame to the computing device. Thus, in the example method 1300 of FIG. 13, two separate frame portion transmissions—each having a different resolution—occur. The computing device may subsequently combine or stitch together the first portion and the modified second portion, so that the multi-resolution image can be viewed on a display.

However, in other embodiments, blocks 1310 and 1312 may be performed in a single transmission. For instance, the A/V recording and communication device 200 may combine the first portion and the modified second portion, generating a modified frame and transmitting that modified frame to the computing device. Alternatively and/or additionally, the A/V recording and communication device 200 may compress or package two separate frames into a single data file (e.g., a compressed archive).

The methods 1200 and 1300 may also include additional operations. In some cases, the A/V recording and communication device 200 may transmit metadata or other information to the computing device to facilitate subsequent processes. For example, the A/V recording and communication device 200 may transmit boundary information, indicating the location of an object of interest within a modified frame. That boundary information may be used by the computing device to identify a person's face and/or to perform computer vision analyses to identify the class or type of object.

Figure 14:
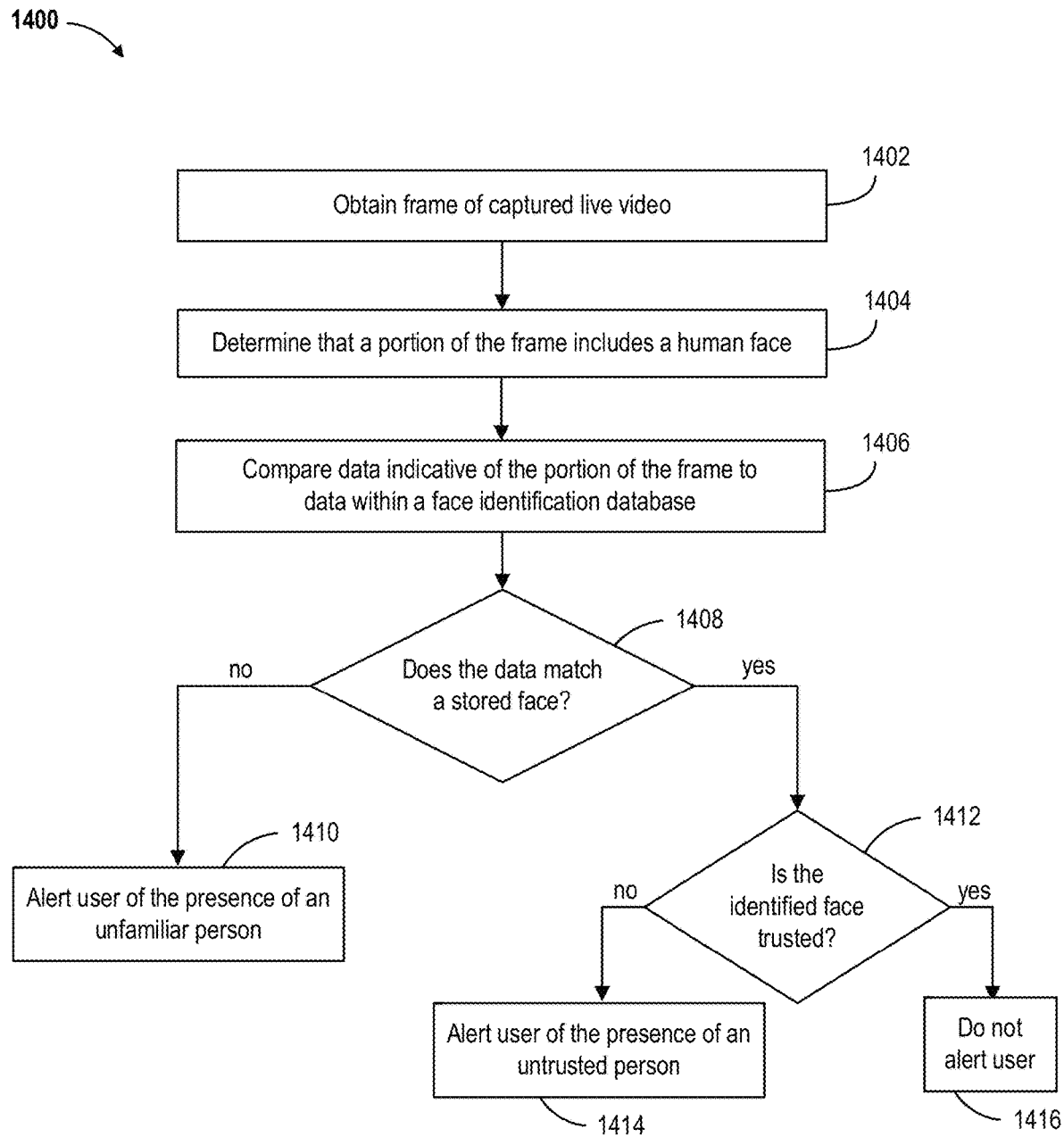
FIG. 14 is a flowchart of an example face identification technique, according to an aspect of the present disclosure.

FIG. 14 is a flowchart of an example face identification technique 1400 according to the present embodiments. Blocks 1402-1416 may be performed by the A/V recording and communication device 200, the communication hub 116, the server 124, another computing device, or some combination thereof. For the purposes of the following description, blocks 1402-1416 are described as being performed by a computing device.

At block 1402, the computing device obtains a frame of live video, which may be captured by the A/V recording and communication device 200, for example. The frame may be received as a transmission over a wide area network.

At block 1404, the computing device determines that a portion of the frame includes a human face. The computing device may use an object recognition engine—such as the object recognition 1100 of FIG. 11—to detect the presence and/or location of a human face within the frame. The frame may be partitioned into at least two portions, with one portion of the frame representing the detected human face.

At block 1406, the computing device compares data indicative of the portion of the frame containing the human face to data within a face identification database. Block 1406 may be carried out by the face identification unit 1103, for example. The face identification database may be the same as or similar to the face identification database(s) 1104. In this example, the face identification database includes a plurality of face records, with each record including facial feature data and a designation of whether the person is "trusted."

The comparison of block 1406 may involve computer vision and/or machine learning techniques to match the face in the portion of the frame to stored facial data. As a specific example, the face in the portion of the frame is processed to determine one or more feature values (e.g., edge detection and measuring relative positions and dimensions of those facial features). Those feature values may then be input into a machine learning tool, such as a decision tree, a support vector machine (SVM), an artificial neural network, or some combination thereof. Regardless of the implementation, the machine learning tool may provide an output indicating whether or not a match was found and, if so, whether the matched face is associated with a trusted person. In some instances, a match may be a binary decision, or may be a confidence threshold (e.g., "90% confidence that the face is matched with person A").

At block 1408, the computing device determines whether or not the portion of the frame matched a stored face. If no match is found, the computing device advances to block 1410. However, if a match is found at block 1408, the computing device advances to block 1412.

At block 1410, the computing device, upon determining that no match is found, alerts the user of the presence of an unfamiliar person. The alert may be, for example, a push notification that is sent to the user's smartphone (e.g., the client device 300).

At block 1412, the computing device, upon determining that a match is found, then determines whether the identified face is associated with a trusted person. This determination may be based on flags, metadata, and/or other information stored in conjunction with the matched facial data.

If the computing device determines that the identified face is not associated with a "trusted" person, the computing device, at block 1414, alerts the user of the presence of an untrusted person. In some embodiments, the matched identity may be associated with a known or at-large criminal, and may be indicated as such within the face identification database. In such a scenario, block 1414 may involve alerting law enforcement about the presence of the known individual.

If the computing device determines that the identified face is associated with a trusted person, the computing device, at block 1416, does not alert the user. In this example, the computing device and/or the A/V recording and communication device 200 is configured to reduce the number of notifications sent to the user, and reserving those notifications for potential security alerts. However, in other embodiments, an alert or notification may be sent to the user upon determining that the identified face is associated with a trusted person. For example, the user may wish to have the computing device notify them when a known mail carrier delivers the mail or a package. Other notifications are also possible.

As described above, the present embodiments leverage the capabilities of audio/video (A/V) recording and communication devices and computing devices, thereby advantageously enhancing home security and preserving important details within live video in limited bandwidth situations. These capabilities permit the A/V recording and communication device 200 to reduce crime and increase public safety by mitigating the loss of information typically associated with video compression.

While various aspects and implementations have been disclosed herein, other aspects and implementations will be apparent to those skilled in the art. The present embodiments are susceptible to modifications and alternate constructions from those discussed above. Consequently, the present invention is not limited to the particular embodiments disclosed. Rather, numerous modifications and alternate constructions fall within the spirit and scope of the present disclosure. For example, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined. The steps in the processes described herein need not be performed in the same order as they have been presented, and may be performed in any order(s), unless logic dictates a particular order. Further, steps that have been presented as being performed separately may in alternative embodiments be performed concurrently. Likewise, steps that have been presented as being performed concurrently may in alternative embodiments be performed separately. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The various embodiments of the present methods for improving the use of available bandwidth for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Networked devices, including A/V recording and communication security devices, frequently communicate with computing devices, including backend servers, over a wide area network (WAN), such as the Internet. Networked devices typically connect to the WAN via a local area network (LAN), including wireless LANs (WLANs). In some cases, a networked device may be configured to transmit a large amount of data to be stored, processed, and/or sent to another computing device.

However, the rate at which data can be transmitted over a network is rarely constant. Spikes in network traffic, hardware failures, and routing errors can affect the transfer speed of data between networked devices. As a result, the amount of data that can be transmitted over a network per unit duration (e.g., megabits per second) can vary over time.

In an example scenario, a device may transmit video data having a particular bitrate over a network to a server. However, due to network volatility, that device's ability to continue the transmission may depend on the network connection having a data bandwidth that is greater than or equal to the bitrate of the video. Thus, a decrease in the data bandwidth of the network connection might interrupt the transmission. The present embodiments address this problem, as described below.

One aspect of the present embodiments includes the realization that, within a given video frame, some portions of that frame may contain more important information compared to the remainder of the frame. For example, A/V recording and communication security devices may transmit video frames that include images of a person, and some of those frames may include images of the person's face. The portions of each frame that include the person and/or the person's face may be considered more important than other portions of the frame. In limited bandwidth scenarios that prevent the transmission of full quality video frames, methods of the present disclosure can prioritize maintaining the quality of the portion of the frame that contains important details, while compressing the remainder of the frame. In this manner, the transmission of live video frames may continue in low bandwidth situations, while maintaining and/or prioritizing the quality of important information.

In a first aspect, a method for adjusting image quality to improve use of available bandwidth is provided. The method involves capturing, by a camera of an audio/video (A/V) recording and communication device, live video of a scene. The live video includes a plurality of frames. A first frame of the plurality of frames is a first amount of data. The method also involves determining a data bandwidth between a computing device and the A/V recording and communication device. The data bandwidth represents a threshold amount of data per frame of the live video that can be transmitted by the A/V recording and communication device. The first amount of data exceeds the threshold amount of data. The method further involves determining, by an object recognition engine, that a first portion of the first frame includes a first object from among one or more predetermined objects. The first frame includes a second portion that does not include the first portion. Additionally, the method involves modifying the first frame to reduce at least a quality of the second portion. Data of the modified frame is a second amount of data that does not exceed the threshold amount of data. Further, the method involves transmitting, by the A/V recording and communication device, the modified frame to the computing device.

In an embodiment of the first aspect, the first object is a human face. In another embodiment, the first object is a face of a specific person.

In an embodiment of the first aspect, the first object is a weapon held by a person. In this embodiment, the method also involves determining, by the object recognition engine, that a third portion of the first frame includes a face of the person holding the weapon. The second portion of the first frame does not include the third portion.

In an embodiment of the first aspect, the method also involves determining that the first portion of the first frame is a third amount of data. In this embodiment, the method further involves determining a reduction amount by which to reduce the quality of the second portion based at least in part on a difference between the threshold amount of data per frame and the third amount of data. Additionally, in this embodiment the method involves modifying the first frame by reducing the quality of the second portion by the reduction amount.

In an embodiment of the first aspect, the method may further involve modifying the first frame to reduce a quality of the first portion, wherein the quality of the first portion is better than the quality of the second portion.

In an embodiment of the first aspect, the second portion of the first frame is represented by a first number of bits. In this embodiment, modifying the first frame involves determining a second number of bits to represent the second portion, wherein the second number of bits is less than the first number of bits.

In an embodiment of the first aspect, the second portion of the first frame comprises a first plurality of pixels, where each pixel of the first plurality of pixels is represented by a first number of bits. In this embodiment, modifying the first frame involves determining, for a given pixel of the first plurality of pixels, a second number of bits to represent the given pixel, where the second number of bits is less than the first number of bits.

In an embodiment of the first aspect, the first number of bits represents intensity values for one or more color channels at a first color depth, the second number of bits represents intensity values for one or more color channels at a second color depth, and the second color depth represents fewer colors than the first color depth.

In an embodiment of the first aspect, the first number of bits represents intensity values for one or more first color channels in a first color space, and the second number of bits represents intensity values for one or more second color channels in a second color space. In this embodiment, modifying the first frame involves determining the second number of bits based on the first number of bits and a color transformation matrix associated with color conversion between the first color space and the second color space.

In an embodiment of the first aspect, modifying the first frame involves encoding, by a first video coder-decoder (codec), the second portion of the first frame and combining the first portion of the first frame and the encoded second portion of the first frame to generate the modified frame.

In an embodiment of the first aspect, determining that the first portion includes a first object involves determining, based on the first portion of the first frame, one or more first feature values representing characteristics of the first portion. Determining that the first portion includes the first object may also involve matching the first portion to a first object from among one or more predetermined objects by determining that the one or more feature values are within a threshold level of similarity to one or more respective predetermined feature values.

In an embodiment of the first aspect, the method also involves combining the first portion and the reduced quality second portion to generate a hybrid quality frame and compressing the hybrid quality frame to produce the modified frame.

In an embodiment of the first aspect, the data bandwidth is a first data bandwidth representing a first threshold amount of data. In this embodiment, the method also involves storing, at a first time, data indicative of the first frame on a data storage device of the A/V recording and communication device. In this embodiment, the method further involves determining, at a second time after the first time, a second data bandwidth representing a second threshold amount of data per frame of the live video that can be transmitted by the A/V recording and communication device, where the data indicative of the first frame does not exceed the second threshold amount of data. Additionally, in this embodiment the method involves transmitting, by the A/V recording and communication device, the data indicative of the first frame to the computing device at the second time.

In an embodiment of the first aspect, the method also involves, for a second frame subsequent to the first frame of the plurality of frames, repeating the steps of (i) determining that the first portion includes a particular object, (ii) modifying the second frame, and (iii) transmitting the modified second frame.

In a second aspect, a method for adjusting image quality to improve use of available bandwidth is provided. The method involves capturing, by a camera of an audio/video (A/V) recording and communication device, live video of a scene. The live video includes a plurality of frames. A first frame of the plurality of frames is a first amount of data. The method also involves determining a data bandwidth between a computing device and the A/V recording and communication device. The data bandwidth represents a threshold amount of data per frame of the live video that can be transmitted by the A/V recording and communication device. The first amount of data exceeds the threshold amount of data. The method further involves determining, by an object recognition engine, that a first portion of the first frame includes a first object from among one or more predetermined objects. The first portion of the first frame is a second amount of data that does not exceed the threshold amount of data. Additionally, the method involves transmitting, by the A/V recording and communication device, the first portion of the first frame to the computing device.

In an embodiment of the second aspect, the method also involves determining, from a frame of the plurality of frames prior to the first frame, a second portion of the prior frame representing an environment of the scene. In this embodiment, the method additionally involves modifying the second portion of the prior frame to reduce at least a quality of the second portion, where the modified second portion is a third amount of data that does not exceed the threshold amount of data. In this embodiment, the method further involves transmitting, by the A/V recording and communication device, the modified second portion of the prior frame. The computing device is configured to combine the modified second portion of the prior frame with the first portion of the first frame.

In an embodiment of the second aspect, the method also involves determining, from a frame of the plurality of frames subsequent to the first frame, that a third portion of the subsequent frame includes the first object. In this embodiment, the method additionally involves transmitting, by the A/V recording and communication device, the third portion of the subsequent frame. The computing device is configured to combine the modified second portion of the prior frame with the third portion of the subsequent frame.

In a third aspect, a method for adjusting image quality to improve use of available bandwidth is provided. The method involves capturing, by a camera of an audio/video (A/V) recording and communication device, live video of a scene. The live video includes a plurality of frames. A first frame of the plurality of frames is a first amount of data. The first frame has a first resolution. The method also involves determining a data bandwidth between a computing device and the A/V recording and communication device. The data bandwidth represents a threshold amount of data per frame of the live video that can be transmitted by the A/V recording and communication device. The first amount of data exceeds the threshold amount of data. The method further involves determining, by an object recognition engine, that a first portion of the first frame includes a first object from among one or more predetermined objects. The first frame includes a second portion that does not include the first portion. Additionally, the method involves modifying the second portion to have a second resolution that is less than the first resolution. The modified second portion and the first portion collectively are a second amount of data that does not exceed the threshold amount of data. Further, the method involves transmitting, by the A/V recording and communication device, the first portion of the first frame to the computing device. The method additionally involves transmitting, by the A/V recording and communication device, the modified second portion to the computing device.

In an embodiment of the third aspect, the computing device is configured to combine the first portion of the first frame and the modified second portion into a multi-quality frame for sub sequent transmission and viewing.

In a fourth aspect, an audio/video (A/V) recording and communication device is provided. The A/V recording and communication device includes a camera, at least one processor, a memory storing instructions that, upon execution by the at least one processor, cause the A/V recording and communication device to perform operations. The operations include capturing, by the camera, an image of a scene. The image is a first amount of data. The operations also include determining a target data size for the image, where the first amount of data exceeds the target data size. The operations further include determining, by an object recognition engine, that a first portion of the image includes a first object from among one or more predetermined objects. The image includes a second portion that does not include the first portion. Additionally, the operations include modifying the image to reduce at least a quality of the second portion. Data of the modified image is a second amount of data that does not exceed the target data size. Further, the operations include transmitting the modified image to the computing device.

In an embodiment of the fourth aspect, the first object is a human face. In another embodiment, the first object is a face of a specific person.

In an embodiment of the fourth aspect, the first object is a weapon held by a person. In this embodiment, the method also involves determining, by the object recognition engine, that a third portion of the image includes a face of the person holding the weapon. The second portion of the image does not include the third portion In an embodiment of the fourth aspect, the operations also include determining that the first portion of the image is a third amount of data. In this embodiment, the operations further include determining a reduction amount by which to reduce the quality of the second portion based at least in part on a difference between the target data size and the third amount of data. In this embodiment, the operations additionally involve modifying the image by reducing the quality of the second portion by the reduction amount.

In an embodiment of the fourth aspect, the operations also include modifying the image to reduce a quality of the first portion, where the quality of the first portion is better than the quality of the second portion.

In an embodiment of the fourth aspect, the second portion of the image is represented by a first number of bits. In this embodiment, modifying the image involves determining a second number of bits to represent the second portion, where the second number of bits is less than the first number of bits.

In an embodiment of the fourth aspect, the second portion of the image comprises a first plurality of pixels, and each pixel of the first plurality of pixels is represented by a first number of bits. In this embodiment, modifying the image involves determining, for a given pixel of the first plurality of pixels, a second number of bits to represent the given pixel, where the second number of bits is less than the first number of bits.

In an embodiment of the fourth aspect, the first number of bits represents intensity values for one or more color channels at a first color depth, the second number of bits represents intensity values for one or more color channels at a second color depth, and the second color depth represents fewer colors than the first color depth.

In an embodiment of the fourth aspect, the first number of bits represents intensity values for one or more first color channels in a first color space, and the second number of bits represents intensity values for one or more second color channels in a second color space. In this embodiment, modifying the image also involves determining the second number of bits based on the first number of bits and a color transformation matrix associated with color conversion between the first color space and the second color space.

In an embodiment of the fourth aspect, modifying the image involves encoding, by a first video coder-decoder (codec), the second portion of the first frame and combining the first portion of the image and the encoded second portion of the image to generate the modified image.

In an embodiment of the fourth aspect, determining that the first portion includes a first object involves determining, based on the first portion of the image, one or more first feature values representing characteristics of the first portion, and matching the first portion to a first object from among one or more predetermined objects by determining that the one or more feature values are within a threshold level of similarity to one or more respective predetermined feature values.

In an embodiment of the fourth aspect, the operations also involve combining the first portion and the reduced quality second portion to generate a hybrid quality image. In this embodiment, the operations further involve compressing the hybrid quality image to produce the modified image.

In an embodiment of the fourth aspect, the target data size is a first target data size representing a first threshold amount of data. In this embodiment, the operations also involve storing, at a first time, data indicative of the image on a data storage device of the A/V recording and communication device. In this embodiment, the operations further involve determining, at a second time after the first time, a second target data size representing a second threshold amount of data that can be transmitted by the A/V recording and communication device. The data indicative of the image does not exceed the second threshold amount of data. In this embodiment, the operations additionally involve transmitting, by the A/V recording and communication device, the data indicative of the image to the computing device at the second time.

In an embodiment of the fourth aspect, the image is a first image. In this embodiment, the operations also involve capturing, by the camera, a second image of the scene. In this embodiment, the operations further involve for the second image, repeating the steps of (i) determining that the first portion includes a particular object, (ii) modifying the second image, and (iii) transmitting the modified second image.

In a fifth aspect, an audio/video (A/V) recording and communication device is provided. The A/V recording and communication device includes a camera, at least one processor, a memory storing instructions that, upon execution by the at least one processor, cause the A/V recording and communication device to perform operations. The operations include capturing, by the camera, an image of a scene. The image is a first amount of data. The operations also include determining a target data size for the image, wherein the first amount of data exceeds the target data size. The operations further include determining, by an object recognition engine, that a first portion of the image includes a first object from among one or more predetermined objects. The first portion of the image is a second amount of data that does not exceed the target data size. Additionally, the operations include transmitting the first portion of the image to the computing device.

In an embodiment of the fifth aspect, the image is a first image. In this embodiment, the operations also include prior to capturing the first image, capturing, by the camera, a second image of the scene. In this embodiment, the operations further include determining, from the second image, a second portion of the second image representing an environment of the scene. In this embodiment, the operations additionally include modifying the second portion of the second image to reduce at least a quality of the second portion, where the modified second portion is a third amount of data that does not exceed the target data size. Further, in this embodiment, the operations include transmitting the modified second portion of the second image. Additionally, in this embodiment, the computing device is configured to combine the modified second portion of the second image with the first portion of the first image.

In this embodiment, the operations may also include, subsequent to capturing the first image, capturing, by the camera, a third image of the scene. In this embodiment, the operations may further include determining, from the third image, that a third portion of the third image includes the first object. In this embodiment, the operations may additionally involve transmitting the third portion of the third image. In this embodiment, the computing device is configured to combine the modified second portion of the second image with the third portion of the third image.

In a sixth aspect, an audio/video (AN) recording and communication device is provided. The A/V recording and communication device includes a camera, at least one processor, a memory storing instructions that, upon execution by the at least one processor, cause the A/V recording and communication device to perform operations. The operations include capturing, by the camera, an image of a scene. The image is a first amount of data. The first frame has a first resolution. The operations also include determining a target data size for the image, wherein the first amount of data exceeds the target data size. The operations further include determining, by an object recognition engine, that a first portion of the image includes a first object from among one or more predetermined objects. The image includes a second portion that does not include the first portion. Additionally, the operations include modifying the second portion to have a second resolution that is less than the first resolution. The modified second portion and the first portion collectively are a second amount of data that does not exceed the target data size. Further, the operations include transmitting the first portion of the image to the computing device. The operations additionally include transmitting the modified second portion to the computing device.

In an embodiment of the sixth aspect, the A/V recording and communication device is further configured to combine the first portion of the image and the modified second portion into a multi-quality image for subsequent transmission and viewing.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

What is claimed is:

1. An audio/video recording and communication device (A/V device) comprising:
    a camera;
    a communications module;
    a processor; and
    a memory storing instructions that, when executed by the processor, cause the A/V device to:
        capture, using the camera, live video of a scene, the live video comprising a plurality of frames, wherein a first frame of the plurality of frames is a first amount of data;
        determine a data bandwidth between a computing device and the A/V device, wherein the data bandwidth corresponds to a threshold amount of data per frame of the live video that can be transmitted by the A/V device, and wherein the first amount of data exceeds the threshold amount of data;
        determine that a first portion of the first frame includes a first object from among one or more predetermined objects, wherein the first frame includes a second portion that does not include the first portion;
        modify the first frame to reduce at least a quality of the second portion, wherein data of the modified first frame is a second amount of data that does not exceed the threshold amount of data; and
        transmit the modified first frame to the computing device.

2. The A/V device of claim 1, wherein the first object is a human face.

3. The A/V device of claim 1, wherein the first object is a face of a specific person.

4. The A/V device of claim 1, wherein the first object is a weapon held by a person, and wherein the instructions further cause the A/V device to:
    determine, by the object recognition engine, that a third portion of the first frame includes a face of the person holding the weapon, wherein the second portion of the first frame does not include the third portion.

5. The A/V device of claim 1, wherein the method instructions further cause the A/V device to:
    determine that the first portion of the first frame is a third amount of data;
    determine a reduction amount by which to reduce the quality of the second portion based at least in part on a difference between the threshold amount of data per frame and the third amount of data; and
    modify the first frame by reducing the quality of the second portion by the reduction amount.

6. The A/V device of claim 1, wherein the instructions further cause the A/V device to:
    modify the first frame to reduce a quality of the first portion, wherein the quality of the first portion is better than the quality of the second portion.

7. The A/V device of claim 1, wherein the second portion of the first frame is represented by a first number of bits, and wherein the instructions that, when executed by the processor, cause the A/V device to modify the first frame comprise instructions that, when executed by the processor, cause the A/V device to:
    determine a second number of bits to represent the second portion, wherein the second number of bits is less than the first number of bits.

8. The A/V device of claim 1, wherein the second portion of the first frame comprises a first plurality of pixels, wherein each pixel of the first plurality of pixels is represented by a first number of bits, and wherein the instructions that, when executed by the processor, cause the A/V device to modify the first frame comprise instructions that, when executed by the processor, cause the A/V device to:
    determine, for a given pixel of the first plurality of pixels, a second number of bits to represent the given pixel, wherein the second number of bits is less than the first number of bits.

9. The A/V device of claim 8, wherein the first number of bits represents intensity values for one or more color channels at a first color depth, wherein the second number of bits represents intensity values for one or more color channels at a second color depth, and wherein the second color depth represents fewer colors than the first color depth.

10. The A/V device of claim 8, wherein the first number of bits represents intensity values for one or more first color channels in a first color space, wherein the second number of bits represents intensity values for one or more second color channels in a second color space, and wherein the instructions that, when executed by the processor, cause the A/V device to modify the first frame comprise instructions that, when executed by the processor, cause the A/V device to:
    determine the second number of bits based on the first number of bits and a color transformation matrix associated with color conversion between the first color space and the second color space.

11. The A/V device of claim 1, wherein the instructions that, when executed by the processor, cause the A/V device to modify the first frame comprise instructions that, when executed by the processor, cause the A/V device to:
    encode, by a first video coder-decoder (codec), the second portion of the first frame; and
    combine the first portion of the first frame and the encoded second portion of the first frame to generate the modified first frame.

12. The A/V device of claim 1, wherein the instructions that, when executed by the processor, cause the A/V device to determine that the first portion includes a first object comprise instructions that, when executed by the processor, cause the A/V device to:
    determine, based on the first portion of the first frame, one or more first feature values representing characteristics of the first portion; and
    match the first portion to a first object from among one or more predetermined objects by determining that the one or more feature values are within a threshold level of similarity to one or more respective predetermined feature values.

13. The A/V device of claim 1, wherein the instructions further cause the A/V device to:
  combine the first portion and the reduced quality second portion to generate a hybrid quality frame; and
  compress the hybrid quality frame to produce the modified frame.

14. The A/V device of claim 1, wherein the data bandwidth is a first data bandwidth representing a first threshold amount of data, and wherein the instructions further cause the A/V device to:
  store, at a first time, data indicative of the first frame on a data storage device of the A/V device;
  determine, at a second time after the first time, a second data bandwidth representing a second threshold amount of data per frame of the live video that can be transmitted by the A/V device, wherein the data indicative of the first frame does not exceed the second threshold amount of data; and
  transmit, by the A/V device, the data indicative of the first frame to the computing device at the second time.

15. The A/V device of claim 1, wherein the instructions further cause the A/V device to:
  for a second frame subsequent to the first frame of the plurality of frames, repeat the instructions that cause the A/V device to (i) determine that the first portion includes a particular object, (ii) modify the second frame, and (iii) transmit the modified second frame.

16. A method for adjusting image quality to improve use of available bandwidth, the method comprising:
  capturing, by a camera of an audio/video (A/V) recording and communication device ("A/V device"), live video of a scene, the live video comprising a plurality of frames at an original image quality, wherein a first frame of the plurality of frames is a first amount of data;
  determining a data bandwidth between a computing device and the A/V device, wherein the data bandwidth corresponds to a threshold amount of data per frame of the live video that can be transmitted by the A/V device, and wherein the first amount of data exceeds the threshold amount of data;
  determining, by an object recognition engine, that a first portion of the first frame includes a first object from among one or more predetermined objects, wherein the first portion of the first frame is a second amount of data that does not exceed the threshold amount of data; and
  transmitting, by the A/V device, a modified frame to the computing device, wherein the modified frame is a third amount of data that does not exceed the threshold amount of data and includes the first portion of the first frame at the original image quality.

17. The method of claim 16, further comprising:
  determining, from a frame of the plurality of frames prior to the first frame, a second portion of the prior frame representing an environment of the scene;
  modifying the second portion of the prior frame to reduce at least a quality of the second portion, wherein the modified second portion is a third amount of data that does not exceed the threshold amount of data; and
  transmitting, by the A/V device, the modified second portion of the prior frame.

18. The method of claim 16, further comprising:
  determining, from a frame of the plurality of frames subsequent to the first frame, that a third portion of the subsequent frame includes the first object; and
  transmitting, by the A/V device, the third portion of the subsequent frame.

19. A method for adjusting image quality to improve use of available bandwidth, the method comprising:
  capturing, by a camera of an audio/video (A/V) recording and communication device ("A/V device"), live video of a scene, the live video comprising a plurality of frames, wherein a first frame of the plurality of frames is a first amount of data, and wherein the first frame has a first resolution;
  determining a data bandwidth between a computing device and the A/V device, wherein the data bandwidth corresponds to a threshold amount of data per frame of the live video that can be transmitted by the A/V device, and wherein the first amount of data exceeds the threshold amount of data;
  determining, by an object recognition engine, that a first portion of the first frame includes a first object from among one or more predetermined objects, wherein the first frame includes a second portion that does not include the first portion;
  modifying the second portion to have a second resolution that is less than the first resolution, wherein the modified second portion and the first portion collectively are a second amount of data that does not exceed the threshold amount of data;
  transmitting, by the A/V device, the first portion of the first frame to the computing device; and
  transmitting, by the A/V device, the modified second portion to the computing device.

20. The method of claim 19, wherein the computing device is configured to combine the first portion of the first frame and the modified second portion into a multi-quality frame for subsequent transmission and viewing.

* * * * *